US012785530B2

(12) United States Patent
Groepper et al.

(10) Patent No.: US 12,785,530 B2
(45) Date of Patent: Nov. 3, 2026

(54) AIR BUSHING LINEAR MOTOR FOR TESTING DEVICE

(71) Applicant: TA INSTRUMENTS-WATERS LLC, New Castle, DE (US)

(72) Inventors: Charles Groepper, Waconia, MN (US); Sudarshan Betigeri, San Jose, CA (US); David L. Dingmann, Saint Paul, MN (US); Kevin Alstrin, Excelsior, MN (US); Nicholas Fruge, Minneapolis, MN (US)

(73) Assignee: TA Instruments-Waters LLC, New Castle, DE (US)

( * ) Notice: Subject to any disclaimer, the term of this patent is extended or adjusted under 35 U.S.C. 154(b) by 359 days.

(21) Appl. No.: 18/535,123

(22) Filed: Dec. 11, 2023

(65) Prior Publication Data

US 2024/0106313 A1 Mar. 28, 2024

Related U.S. Application Data

(63) Continuation of application No. 16/748,084, filed on Jan. 21, 2020, now Pat. No. 11,843,301.

(60) Provisional application No. 62/795,273, filed on Jan. 22, 2019.

(51) Int. Cl.
*H02K 41/03* (2006.01)

(52) U.S. Cl.
CPC .................................. *H02K 41/033* (2013.01)

(58) Field of Classification Search
CPC ...... H02K 41/02; H02K 41/025; H02K 41/03; H02K 41/031; H02K 41/033; H02K 41/00
See application file for complete search history.

(56) References Cited

U.S. PATENT DOCUMENTS

| | | | | |
|---|---|---|---|---|
| 300,691 A | 6/1884 | Brown | | |
| 2,735,950 A | 2/1956 | Brown | | |
| 4,037,122 A * | 7/1977 | Bonner | ................. | H02K 41/03 318/135 |
| 4,415,824 A | 11/1983 | Meier | | |

(Continued)

FOREIGN PATENT DOCUMENTS

| | | | |
|---|---|---|---|
| CA | 2329664 A1 | 8/2000 | |
| CN | 101635499 A | 1/2010 | |

(Continued)

OTHER PUBLICATIONS

International Search Report and Written Opinion in PCT/US2020/014380 mailed on Apr. 17, 2020.

(Continued)

*Primary Examiner* — Oluseye Iwarere
*Assistant Examiner* — Nicholas Lee Setzer
(74) *Attorney, Agent, or Firm* — Schmeiser Olsen, PLLC; Victor J. Baranowski, Esq.

(57) ABSTRACT

A linear motor including a stator assembly, an armature mechanically coupleable to a test specimen configured to be moved relative to the stator assembly by operation of the linear motor, and a suspension system configured facilitate movement of the armature relative to the stator assembly along an axis of movement without physically touching the armature during movement. Further disclosed is a multi-phase linear motor, a linear motor having an armature with an array of flat magnets, and a linear motor having a magnetic damping system.

22 Claims, 16 Drawing Sheets

(56) References Cited

U.S. PATENT DOCUMENTS

| | | | | |
|---|---|---|---|---|
| 4,616,789 | A * | 10/1986 | Matsui | B65H 67/06 242/475.9 |
| 4,618,789 | A * | 10/1986 | Flisikowski | H02K 41/0356 310/27 |
| 4,839,543 | A | 6/1989 | Beakley et al. | |
| 4,839,547 | A | 6/1989 | Lordo et al. | |
| 4,859,974 | A | 8/1989 | Kliman et al. | |
| 4,908,533 | A * | 3/1990 | Karita | H02K 41/03 318/135 |
| 4,985,651 | A | 1/1991 | Chitayat | |
| 5,005,672 | A | 4/1991 | Nakai et al. | |
| 5,331,238 | A | 7/1994 | Johnsen | |
| 5,670,708 | A | 9/1997 | Vilendrer | |
| 5,703,418 | A | 12/1997 | Assa | |
| 5,712,431 | A | 1/1998 | Vilendrer | |
| 5,767,402 | A * | 6/1998 | Sandlass | G01N 3/08 73/796 |
| 6,107,703 | A | 8/2000 | Korenaga | |
| 6,185,999 | B1 | 2/2001 | Arrington et al. | |
| 6,300,691 | B1 | 10/2001 | Hwang et al. | |
| 6,405,599 | B1 | 6/2002 | Patt | |
| 6,469,406 | B1 | 10/2002 | Hwang et al. | |
| 6,547,783 | B1 | 4/2003 | Vilendrer et al. | |
| 6,598,486 | B2 | 7/2003 | Vilendrer et al. | |
| 6,753,626 | B2 | 6/2004 | Hwang et al. | |
| 6,791,214 | B2 | 9/2004 | Korenaga | |
| 6,810,751 | B2 | 11/2004 | Moreno et al. | |
| 6,992,410 | B2 | 1/2006 | Chen et al. | |
| 7,207,866 | B2 | 4/2007 | Allaire et al. | |
| 7,472,604 | B2 | 1/2009 | Moore, Jr. et al. | |
| 7,546,775 | B2 | 6/2009 | Chinavare | |
| 7,587,949 | B2 | 9/2009 | Dingmann et al. | |
| 7,624,648 | B2 | 12/2009 | Nickel et al. | |
| 7,679,229 | B2 | 3/2010 | Mark | |
| 7,694,593 | B2 | 4/2010 | Owens et al. | |
| 7,800,257 | B2 | 9/2010 | Lu | |
| 7,846,715 | B2 | 12/2010 | Owens et al. | |
| 7,966,890 | B2 | 6/2011 | Dingmann et al. | |
| 8,175,833 | B2 | 5/2012 | White | |
| 8,444,935 | B2 | 5/2013 | Nickel et al. | |
| 9,194,783 | B2 | 11/2015 | McMullen et al. | |
| 9,270,155 | B2 | 2/2016 | Kuhlmann et al. | |
| 9,353,345 | B2 | 5/2016 | Zhang et al. | |
| 9,366,692 | B2 | 6/2016 | White et al. | |
| 9,444,308 | B2 | 9/2016 | Andrikowich et al. | |
| 9,455,608 | B2 | 9/2016 | Schulz et al. | |
| 9,496,778 | B2 | 11/2016 | Andrikowich et al. | |
| 9,506,782 | B2 | 11/2016 | White | |
| 9,594,358 | B2 | 3/2017 | White et al. | |
| 9,606,035 | B2 | 3/2017 | Williams et al. | |
| 9,662,210 | B2 | 5/2017 | Dingmann et al. | |
| 9,680,352 | B2 | 6/2017 | Hayner et al. | |
| 9,726,170 | B1 | 8/2017 | Nickel et al. | |
| 9,753,104 | B2 | 9/2017 | Duffin et al. | |
| 9,768,675 | B2 | 9/2017 | Andrikowich et al. | |
| 9,797,943 | B2 | 10/2017 | Kuhlmann et al. | |
| 9,840,688 | B2 | 12/2017 | Owens et al. | |
| 9,841,362 | B2 | 12/2017 | McMullen et al. | |
| 9,913,718 | B2 | 3/2018 | Dingmann et al. | |
| 10,006,932 | B2 | 6/2018 | White et al. | |
| 10,105,227 | B2 | 10/2018 | Dingmann et al. | |
| 10,173,044 | B2 | 1/2019 | Groepper et al. | |
| 10,350,069 | B2 | 7/2019 | Dingmann et al. | |
| 10,533,679 | B2 | 1/2020 | Goll et al. | |
| 10,826,369 | B2 | 11/2020 | Angood et al. | |
| 10,879,767 | B2 | 12/2020 | Andrikowich et al. | |
| 10,892,078 | B2 | 1/2021 | Simon et al. | |
| 10,992,193 | B2 | 4/2021 | Haeg et al. | |
| 2001/0043133 | A1* | 11/2001 | Takanashi | H01F 7/1607 335/256 |
| 2003/0117026 | A1 | 6/2003 | Korenaga | |
| 2004/0083966 | A1* | 5/2004 | Takahashi | G03F 7/70833 118/715 |
| 2008/0024014 | A1 | 1/2008 | Kang et al. | |
| 2010/0096935 | A1* | 4/2010 | Hennessey | G03F 7/70758 310/12.06 |
| 2012/0280579 | A1 | 11/2012 | Carlmark et al. | |
| 2014/0011170 | A1 | 1/2014 | Nickel et al. | |
| 2016/0032950 | A1 | 2/2016 | Owens et al. | |
| 2016/0164392 | A1* | 6/2016 | Chen | H02K 41/031 310/12.29 |
| 2016/0341651 | A1 | 11/2016 | Chinavare et al. | |
| 2017/0098979 | A1 | 4/2017 | Andrikowich et al. | |
| 2017/0252164 | A1 | 9/2017 | Dingmann et al. | |
| 2018/0072976 | A1 | 3/2018 | Owens et al. | |
| 2019/0109501 | A1* | 4/2019 | Haeg | F16C 29/005 |
| 2019/0356200 | A1* | 11/2019 | Haynes | G01M 7/02 |
| 2020/0124500 | A1* | 4/2020 | Haynes | G01M 7/022 |
| 2021/0108998 | A1* | 4/2021 | Pokhil | G01N 3/02 |

FOREIGN PATENT DOCUMENTS

| | | | |
|---|---|---|---|
| CN | 1709727 | B | 3/2011 |
| CN | 102231614 | A | 11/2011 |
| CN | 102900805 | A | 1/2013 |
| CN | 103427587 | A | 12/2013 |
| CN | 103731005 | A | 4/2014 |
| CN | 104813571 | A | 7/2015 |
| CN | 205506583 | U | 8/2016 |
| CN | 107257181 | A | 10/2017 |
| CN | 107819421 | A | 3/2018 |
| CN | 111490619 | A | 8/2020 |
| DE | 102009017042 | A1 | 10/2010 |
| DE | 102019123103 | B3 | 2/2021 |
| JP | H11-281554 | A | 10/1999 |
| JP | 2001333566 | A | 11/2001 |
| JP | 4218201 | B2 | 2/2009 |
| JP | 2010127797 | A | 6/2010 |
| JP | 2013050172 | A | 3/2013 |
| KR | 102163168 | B1 | 10/2020 |
| WO | 2007113670 | A2 | 10/2007 |
| WO | 2009109935 | A2 | 9/2009 |
| WO | 2012035858 | A1 | 3/2012 |

OTHER PUBLICATIONS

"Electroforce Load Frame and Testbench Instruments" TA Instruments, 2019.

"ElectroForce 3300" TA Instruments, 2019. https://www.tainstruments.com/3330-system/.

"ElectroForce Load-Frame Instruments" TA Instruments, 2019. https://www.tainstruments.com/products/electroforce-mechanical-testers/load-frame-systems/.

"Multi-Specimen Fatigue ElectroForce 3300 from TA Instruments," TA Instruments, 2019. Video. https://www.tainstruments.com/multi-specimen-fatigue-electroforce-3300-from-ta-instruments/.

"TA ElectroForce Electromagnetic Linear Motor," TA Instruments, 2019. Video. https://www.tainstruments.com/ta-electroforce-electromagnetic-linear-motor/.

International Preliminary Report on Patentability on PCT/US2020/014380 mailed on Aug. 5, 2021.

Examination Report in European patent application No. 20706907.1 mailed on Jan. 31, 2024.

Non-Final Office Action in U.S. Appl. No. 16/748,084 mailed on Oct. 26, 2021.

Final Office Action in U.S. Appl. No. 16/748,084 mailed on Mar. 21, 2022.

Non-Final Office Action in U.S. Appl. No. 16/748,084 mailed on Jul. 1, 2022.

Final Office Action in U.S. Appl. No. 16/748,084 mailed on Nov. 25, 2022.

Notice of Allowance in U.S. Appl. No. 16/748,084 mailed on Jul. 28, 2023.

Non-Final Office Action in U.S. Appl. No. 16/748,084 mailed on Jun. 14, 2021.

* cited by examiner

AIR BUSHING LINEAR MOTOR FOR TESTING DEVICE

RELATED APPLICATIONS

This application is a continuation of U.S. patent application Ser. No. 16/748,084, filed Jan. 21, 2020, entitled "Linear Motor," which is a non-provisional patent application claiming priority to U.S. Provisional Patent Application No. 62/795,273, filed Jan. 22, 2019, entitled "Linear Motor," which is incorporated herein by reference.

FIELD OF THE INVENTION

The invention relates generally to material testing systems. More particularly, the invention relates to a linear motor for material testing systems.

BACKGROUND

Linear motors are typically utilized in material testing systems. In these material testing systems, linear motors are known to utilize electricity and magnetism to create back and forth movement in an armature that is coupleable to a test specimen. The moving assembly may be "frictionless," in that it can be arranged and constructed to operate without sliding or rolling contact between the armature and a suspension system of the armature. Flexural suspension structures for driving the armature are known, such as that which is described in U.S. Pat. No. 6,405,599. These flexible suspension structures, to which the armature is directly physically attached, limit movement of the armature based the material properties and bendable nature of the flexural suspension structures—the more the armature moves from a center position due to electromagnetic forces, the greater the resistance force on the armature from the flexural suspension structures.

Thus, a linear motor having frictionless properties, and associated methods of use and assembly thereof, would be well received in the art.

SUMMARY

In one exemplary embodiment, a testing device includes a linear motor including a stator assembly, an armature mechanically coupleable to a test specimen configured to be moved relative to the stator assembly by operation of the linear motor, a suspension system configured to facilitate movement of the armature relative to the stator assembly along an axis of movement without physically touching the armature during movement.

In addition or alternatively, the suspension system of the testing device includes at least one air bushing that is configured to allow movement of the armature with respect to the suspension system without sliding or rolling contact between the armature and the suspension system.

In addition or alternatively, the suspension system of the testing device includes a frame body having a first opening extending along a first axis that is parallel to the axis of movement, wherein the at least one air bushing is located within the first opening, and wherein the armature includes a first air bushing shaft extending within the first opening.

In addition or alternatively, the at least one air bushing of the testing device includes a first air bushing located proximate a first end of the first opening and a second air bushing located proximate a second end of the first opening.

In addition or alternatively, the frame body of the testing device includes a second opening extending along a second axis that is parallel to the axis of movement, and wherein the armature includes a second air bushing shaft extending within the second opening, wherein the second opening includes a third air bushing located proximate a first end of the second opening and a fourth air bushing located proximate a second end of the second opening.

In addition or alternatively, the at least one air bushing of the testing device is installed within the first opening of the frame body in a compliant manner such that some movement between the air bushing and the frame body is permitted.

In addition or alternatively, the at least one air bushing of the testing device is removably attached within the first opening of the frame body with an interference fit.

In addition or alternatively, the at least one air bushing of the testing device has a hollow cylindrical shape, and wherein the first air bushing shaft is a cylindrical shaft having a radius that is between 3 and 5 microns less than an inner radius of the at least one air bushing.

In addition or alternatively, the stator assembly of the testing device includes a first coil sub-assembly and a second coil sub-assembly, wherein the armature is located and extends between the first coil sub-assembly and the second coil sub assembly, the armature including magnet frame having a plurality of permanent magnets disposed thereon, wherein the first air bushing shaft extends parallel to the magnet frame, and wherein a top end plate and a bottom end plate connect the first and second air bushing shafts to the magnet frame such that a first space extends parallel to the axis of movement between the first air bushing shaft and the magnet frame, and such that a second space extends parallel to the axis of movement between the second air bushing shaft and the magnet frame, the testing device further comprising a ducting system configured to use airflow through the at least one air bushing in cooling at least one of coils of the first coil sub-assembly and the second coil sub-assembly and the armature.

In addition or alternatively, the armature of the testing device includes a test specimen shaft extending from at least one of the top end plate and the bottom end plate, and wherein a fifth air bushing surrounds the test specimen shaft.

In another exemplary embodiment, a linear motor includes a stator assembly configured to receive power, an armature proximate the stator assembly and configured to be moved relative to the stator assembly when the stator assembly receives power, and a suspension system configured to facilitate movement of the armature ion relative to the stator assembly along an axis of movement without physically touching the armature during movement.

In addition or alternatively, the suspension system of the linear motor includes at least one air bushing that is configured to allow movement of the armature with respect to the suspension system without sliding or rolling contact between the armature and the suspension system.

In addition or alternatively, the suspension system of the linear motor includes a frame body having a first opening extending along a first axis that is parallel to the axis of movement, wherein the at least one air bushing is located within the first opening, and wherein the armature includes a first air bushing shaft extending within the first opening.

In addition or alternatively, the at least one air bushing of the linear motor includes a first air bushing located proximate a first end of the first opening and a second air bushing located proximate a second end of the first opening.

In addition or alternatively, the frame body of the linear motor includes a second opening extending along a second axis that is parallel to the axis of movement, and wherein the armature includes a second air bushing shaft extending within the second opening, wherein the second opening includes a third air bushing located proximate a first end of the second opening and a fourth air bushing located proximate a second end of the second opening.

In addition or alternatively, the at least one air bushing of the linear motor is installed within the first opening of the frame body in a compliant manner such that some movement between the air bushing and the frame body is permitted.

In addition or alternatively, the at least one air bushing of the linear motor is removably attached within the first opening of the frame body with an interference fit.

In addition or alternatively, the at least one air bushing of the linear motor has a hollow cylindrical shape, and wherein the first air bushing shaft is a cylindrical shaft having a radius that is between 3 and 5 microns less than an inner radius of the at least one air bushing.

In addition or alternatively, the stator assembly of the linear motor includes a first coil sub-assembly and a second coil sub-assembly, wherein the armature is located and extends between the first coil sub-assembly and the second coil sub assembly, the armature including magnet frame having a plurality of permanent magnets disposed thereon, wherein the first air bushing shaft extends parallel to the magnet frame, and wherein a top end plate and a bottom end plate connect the first and second air bushing shafts to the magnet frame such that a first space extends parallel to the axis of movement between the first air bushing shaft and the magnet frame, and such that a second space extends parallel to the axis of movement between the second air bushing shaft and the magnet frame, the linear motor further comprising a ducting system configured to use airflow through the at least one air bushing in cooling at least one of coils of the first coil sub-assembly and the second coil sub-assembly and the armature.

In another exemplary embodiment, a method includes providing a stator assembly, an armature proximate the stator assembly, and a suspension system, receiving power by the stator assembly, moving the armature relative to the stator assembly back and forth along an axis of movement after the receiving power by the stator assembly, and supporting the armature with the suspension system without physically touching the armature during the moving.

In another exemplary embodiment, a testing device includes a multi-phase linear motor including a stator assembly, an armature mechanically coupleable to a test specimen configured to be moved relative to the stator assembly by operation of the multi-phase linear motor, and a suspension system configured to support the armature and controlling the movement of the armature relative to the stator assembly, wherein the suspension system is constructed to operate without sliding or rolling contact between the armature and the suspension system.

In addition or alternatively, the multi-phase linear motor of the testing device is a three-phase linear motor.

In addition or alternatively, the stator assembly of the testing device includes a first coil sub-assembly and a second coil sub-assembly, wherein the armature is located and extends between the first coil sub-assembly and the second coil sub assembly, the armature including a plurality of permanent magnets disposed thereon.

In addition or alternatively, the first coil sub-assembly of the testing device is a laminated magnetic core that includes a plurality of poles upon which a plurality of vertically disposed windings are wrapped creating a first coil stack, and wherein the second coil sub-assembly is a laminated magnetic core that includes a plurality of poles upon which a plurality of vertically disposed windings are wrapped creating a second coil stack.

In addition or alternatively, the magnetic core of the first coil assembly of the testing device includes six poles and six vertically disposed windings, and wherein the magnetic core of the second coil assembly includes six poles and six vertically disposed windings, and wherein the top and fourth windings of each of the first and second coil stacks are connected to a first phase of the three-phase linear motor, wherein the second and fifth windings of each of the first and second coil stacks are connected to a second phase of the three-phase linear motor, and wherein the third and sixth windings of each of the first and second coil stacks are connected to a third phase of the three-phase linear motor.

In addition or alternatively, a gap is located between each of the plurality of vertically disposed windings of the first and second coil stacks of the testing device, the materials testing device further comprising at least one cooling duct configured to provide cooling air through the gaps located between each of the plurality of vertically disposed windings of the first and second coil stacks.

In addition or alternatively, each of the plurality of poles of the testing device includes a coil bobbin having integrated cooling fins disposed thereon, the integrated cooling fins extending through the windings and into the gap between windings.

In addition or alternatively, the testing device further includes potting material located within each of the gaps, and at least one heat pipe embedded within the potting material of each of the gaps, the heat pipes configured to transfer heat from the plurality of vertically disposed windings of the first and second coil stacks.

In addition or alternatively, the testing device further includes at least one cooling fin attached to each of the heat pipes, the at least one cooling fin configured to facilitate heat transfer.

In addition or alternatively, a stroke of the armature of the testing device is at least 70 mm.

In addition or alternatively, the suspension system of the testing device includes a first side frame and a second side frame configured to support the armature, and wherein each of the first and second coil assemblies are located between the first side frame and the second side frame, the suspension system further including a top mounting plate for attaching to each of the first and second side frames and the first and second coil assemblies, the suspension system further attaching to each of the first and second side frames and the first and second coil assemblies.

In addition or alternatively, the first side frame and the second side frame of the testing device each have an I-shaped cross section, wherein a first cooling duct is attached to the first side frame such that a space located between the top and bottom of a first side of the I-shaped cross section of the first side frame defines an air pathway, wherein a second cooling duct is attached to the first side frame such that a space located between a top and bottom of a second side of the I-shaped cross section of the first side frame defines an air pathway, wherein a third cooling duct is attached to the second side frame such that a space located between the top and bottom of a first side of the I-shaped cross section of the second side frame defines an air pathway, and wherein a second cooling duct is attached to the second side frame such that a space located between a top and bottom of a second side of the I-shaped cross section of the second side frame defines an air pathway.

In another exemplary embodiment, a linear motor includes a multi-phase stator assembly including at least one stack having a plurality of cores, an armature proximate the multi-phase stator assembly and configured to be moved relative to the multi-phase stator assembly when power is provided to the multi-phase stator assembly, and a suspension system configured to support the armature and controlling the movement of the armature relative to the multi-phase stator assembly, wherein the suspension system is constructed to operate without sliding or rolling contact between the armature and the suspension system.

In addition or alternatively, the linear motor is a three-phase linear motor and wherein the multi-phase stator assembly is a three-phase stator assembly.

In addition or alternatively, the multi-phase stator assembly of the linear motor includes a first coil sub-assembly and a second coil sub-assembly, wherein the armature is located and extends between the first coil sub-assembly and the second coil sub assembly, the armature including a plurality of permanent magnets disposed thereon.

In addition or alternatively, the first coil sub-assembly of the linear motor is a laminated magnetic core that includes a plurality of poles upon which a plurality of vertically disposed windings are wrapped creating a first coil stack, and wherein the second coil sub-assembly is a laminated magnetic core that includes a plurality of poles upon which a plurality of vertically disposed windings are wrapped creating a second coil stack.

In addition or alternatively, the magnetic core of the first coil assembly of the linear motor includes six poles and six vertically disposed windings, and wherein the magnetic core of the second coil assembly includes six poles and six vertically disposed windings, and wherein the top and fourth windings of each of the first and second coil stacks are connected to a first phase of the three-phase linear motor, wherein the second and fifth windings of each of the first and second coil stacks are connected to a second phase of the three-phase linear motor, and wherein the third and sixth windings of each of the first and second coil stacks are connected to a third phase of the three-phase linear motor.

In addition or alternatively, a gap is located between each of the plurality of vertically disposed windings of the first and second coil stacks of the linear motor, the materials testing device further comprising at least one cooling duct configured to provide cooling air through the gaps located between each of the plurality of vertically disposed windings of the first and second coil stacks.

In addition or alternatively, a stroke of the armature of the linear motor is at least 70 mm.

In addition or alternatively, a method includes providing a linear motor having a multi-phase stator assembly, an armature proximate the multi-phase stator assembly, and a suspension system, receiving power by the multi-phase stator assembly, moving the armature back and forth along an axis of movement relative to the multi-phase stator assembly after the receiving power by the multi-phase stator assembly, and supporting the armature with the suspension system by controlling movement of the armature relative to the multi-phase stator assembly such that no sliding or rolling contact is made between the armature and the suspension system.

In another exemplary embodiment, a testing device includes a linear motor including a stator assembly, an armature mechanically coupleable to a test specimen configured to be moved relative to the stator assembly by operation of the linear motor, the armature including an array of flat magnets configured to create movement in the armature in response to a magnetic field generated by the stator assembly, and a suspension system configured to support the armature and controlling the movement of the armature relative to the stator assembly, wherein the suspension system is constructed to operate without sliding or rolling contact between the armature and the suspension system.

In addition or alternatively, the armature of the testing device includes a magnet frame having the plurality of permanent magnets disposed therein such that the plurality of magnets are exposed from a first side of the armature and from a second side of the armature that is opposite the first side.

In addition or alternatively, the array of the testing device includes two columns of the flat tile magnets arranged with alternating polarity.

In addition or alternatively, the flat tile magnets of each of the first and second array of the testing device are attached to the armature in skewed manner such that a bottom and top edge of each of the flat tile magnets is not orthogonal to side edges of the flat tile magnets.

In addition or alternatively, each of the two columns of the array of the testing device includes fourteen flat tile magnets.

In addition or alternatively, the stator assembly of the testing device includes a first coil sub-assembly and a second coil sub-assembly, wherein the armature is located and extends between the first coil sub-assembly and the second coil sub assembly, wherein the first coil sub-assembly includes a plurality of poles upon which a plurality of vertically disposed windings are wrapped creating a first coil stack, and wherein the second coil sub-assembly a plurality of poles upon which a plurality of vertically disposed windings are wrapped creating a second coil stack.

In addition or alternatively, the array of flat magnets extend along the armature of the testing device a first length that is greater than a second length of each of the first and second coil stacks.

In addition or alternatively, the armature of the testing device includes a magnet frame having the first side proximate the first coil assembly, the magnet frame having the second side opposite the first side and proximate the second coil assembly, the armature further including a first bushing shaft, a second bushing shaft, a top end plate and a bottom end plate, wherein the top end plate and the bottom end plate connect the first and second bushing shafts to the magnet frame such that a first space extends parallel to an axis of movement between the first bushing shaft and the magnet frame and such that a second space extends parallel to the axis of movement between the second air bushing shaft and the magnet frame.

In addition or alternatively, a stroke of the armature of the testing device is at least 70 mm.

In addition or alternatively, each of the flat magnets of the testing device includes a thickness between 10 mm and 22 mm, and each of the flat magnets are permanent neo magnets.

In another exemplary embodiment, a linear motor includes a stator assembly configured to receive power, an armature mechanically coupleable to a test specimen configured to be moved relative to the stator assembly when the stator assembly receives power, the armature including an array of flat magnets configured to create movement in the armature in response to a magnetic field generated by the stator assembly, and a suspension system configured to support the armature and controlling the movement of the armature relative to the stator assembly. The suspension system is constructed to operate without sliding or rolling contact between the armature and the suspension system.

In addition or alternatively, the armature of the linear motor includes a magnet frame having the plurality of permanent magnets disposed therein such that the plurality of magnets are exposed from a first side of the armature and from a second side of the armature that is opposite the first side.

In addition or alternatively, the array of the linear motor includes two columns of the flat tile magnets arranged with alternating polarity.

In addition or alternatively, the flat tile magnets of each of the first and second array of the linear motor are attached to the armature in skewed manner such that a bottom and top edge of each of the flat tile magnets is not orthogonal to side edges of the flat tile magnets.

In addition or alternatively, each of the two columns of the array of the linear motor includes fourteen flat tile magnets.

In addition or alternatively, the stator assembly of the linear motor includes a first coil sub-assembly and a second coil sub-assembly, wherein the armature is located and extends between the first coil sub-assembly and the second coil sub assembly, wherein the first coil sub-assembly includes a plurality of poles upon which a plurality of vertically disposed windings are wrapped creating a first coil stack, and wherein the second coil sub-assembly a plurality of poles upon which a plurality of vertically disposed windings are wrapped creating a second coil stack.

In addition or alternatively, the array of flat magnets extend along the armature of the linear motor a first length that is greater than a second length of each of the first and second coil stacks.

In addition or alternatively, the armature of the linear motor includes a magnet frame having the first side proximate the first coil assembly, the magnet frame having the second side opposite the first side and proximate the second coil assembly, the armature further including a first bushing shaft, a second bushing shaft, a top end plate and a bottom end plate, wherein the top end plate and the bottom end plate connect the first and second bushing shafts to the magnet frame such that a first space extends parallel to an axis of movement between the first bushing shaft and the magnet frame and such that a second space extends parallel to the axis of movement between the second air bushing shaft and the magnet frame.

In addition or alternatively, a stroke of the armature of the linear motor is at least 70 mm.

In another exemplary embodiment, a method includes providing a stator assembly, an armature proximate the stator assembly having an array of flat magnets disposed thereon, and a suspension system, receiving power by the stator assembly, exposing the array of flat magnets to a magnetic field generated by the stator assembly, creating back and forth movement in the armature relative to the stator assembly, by the array of flat magnets, and supporting the armature with the suspension system by controlling movement of the armature relative to the multi-phase stator assembly such that no sliding or rolling contact is made between the armature and the suspension system.

In another exemplary embodiment, a testing device includes a linear motor including a stator assembly, an armature mechanically coupleable to a test specimen configured to be moved relative to the stator assembly by operation of the linear motor, a suspension system configured to support the armature and controlling the movement of the armature relative to the stator assembly, wherein the suspension system is constructed to operate without sliding or rolling contact between the armature and the suspension system, and a magnetic damping system configured to absorb kinetic energy of the armature movement when power is cut to the linear motor.

In addition or alternatively, the magnetic damping system of the testing device includes an array of magnets disposed on a frame of the suspension system parallel to an axis of movement of the armature, wherein the array of magnets is configured to absorb the kinetic energy of the armature movement when power is cut to the linear motor, and wherein the array of magnets is configured to provide damping during operation of the linear motor to enhance control of the movement of the armature.

In addition or alternatively, the array of magnets of the magnetic damping system of the testing device are separate from magnets used to create movement of the armature by the linear motor, wherein the array of magnets is located proximate a conductive non-magnetic surface of the armature that extends parallel to the axis of movement of the armature.

In addition or alternatively, a gap of less than 1 cm exists between the array of magnets and the conductive non-magnetic surface of the armature of the testing device.

In addition or alternatively, the linear motor of the testing device is a three-phase linear motor, and wherein the magnetic damping system is configured to short power to each of the three phases simultaneously.

In addition or alternatively, the stator assembly of the testing device includes a first coil sub-assembly and a second coil sub-assembly, wherein the first coil sub-assembly includes a plurality of poles upon which a plurality of vertically disposed windings are wrapped creating a first coil stack, and wherein the second coil sub-assembly includes a plurality of poles upon which a plurality of vertically disposed windings are wrapped creating a second coil stack.

In addition or alternatively, movement of the armature of the testing device with respect to the first coil sub-assembly and the second coil sub-assembly immediately after the power is shorted is configured to create an electromagnetic force that produces a current and force that resists motion of the armature.

In addition or alternatively, the magnetic damping system of the testing device includes a first array of magnets disposed on a frame of the suspension system parallel to an axis of movement of the armature proximate a first side of the armature, and wherein the magnetic damping system includes a second array of magnets disposed on the frame of the suspension system parallel to the axis of movement of the armature proximate a second side of the armature, In addition or alternatively, the first and second arrays of magnets of the magnetic damping system of the testing device are separate from magnets used to create movement of the armature by the linear motor, wherein the first array of magnets are located proximate a first conductive non-magnetic surface of the armature that extends parallel to the axis of movement of the armature, and wherein the second array of magnets are located proximate a second conductive non-magnetic surface of the armature that extends parallel to the axis of movement of the armature, wherein the first and second arrays of magnets are configured to absorb the kinetic energy of the armature movement when power is cut to the linear motor.

In addition or alternatively, each magnet of the array of magnets of the testing device is a flat tile permanent neo magnet.

In another exemplary embodiment, a linear motor includes a stator assembly configured to receive power, an armature mechanically coupleable to a test specimen configured to be moved relative to the stator assembly when the stator assembly receives power, a suspension system configured to support the armature and controlling the movement of the armature relative to the stator assembly, wherein the suspension system is constructed to operate without sliding or rolling contact between the armature and the suspension system, and a magnetic damping system configured to absorb kinetic energy of the armature movement when power is cut to the linear motor.

In addition or alternatively, the magnetic damping system of the linear motor includes an array of magnets disposed on a frame of the suspension system parallel to an axis of movement of the armature, wherein the array of magnets is configured to absorb the kinetic energy of the armature movement when power is cut to the linear motor.

In addition or alternatively, the array of magnets of the magnetic damping system of the linear motor are separate from magnets used to create movement of the armature by the linear motor, wherein the array of magnets is located proximate a conductive non-magnetic surface of the armature that extends parallel to the axis of movement of the armature.

In addition or alternatively, a gap of less than 1 cm exists between the array of magnets and the conductive non-magnetic surface of the armature of the linear motor.

In addition or alternatively, the linear motor is a three-phase linear motor, and wherein the magnetic damping system is configured to short power to each of the three phases simultaneously.

In addition or alternatively, the stator assembly of the linear motor includes a first coil sub-assembly and a second coil sub-assembly, wherein the first coil sub-assembly includes a plurality of poles upon which a plurality of vertically disposed windings are wrapped creating a first coil stack, and wherein the second coil sub-assembly includes a plurality of poles upon which a plurality of vertically disposed windings are wrapped creating a second coil stack.

In addition or alternatively, movement of the armature of the linear motor with respect to the first coil sub-assembly and the second coil sub-assembly immediately after the power is shorted is configured to create an electromagnetic force that produces a current and force that resists motion of the armature.

In addition or alternatively, the magnetic damping system of the linear motor includes a first array of magnets disposed on a frame of the suspension system parallel to an axis of movement of the armature proximate a first side of the armature, and wherein the magnetic damping system includes a second array of magnets disposed on the frame of the suspension system parallel to the axis of movement of the armature proximate a second side of the armature, In addition or alternatively, the first and second arrays of magnets of the magnetic damping system of the linear motor are separate from magnets used to create movement of the armature by the linear motor, wherein the first array of magnets are located proximate a first conductive non-magnetic surface of the armature that extends parallel to the axis of movement of the armature, and wherein the second array of magnets are located proximate a second conductive non-magnetic surface of the armature that extends parallel to the axis of movement of the armature, wherein the first and second arrays of magnets are configured to absorb the kinetic energy of the armature movement when power is cut to the linear motor.

In another exemplary embodiment, a method includes providing a stator assembly, an armature proximate the stator assembly, a suspension system, and a magnetic damping system, receiving power by the stator assembly, moving the armature relative to the stator assembly back and forth along an axis of movement after the receiving power by the stator assembly, supporting the armature with the suspension system by controlling movement of the armature relative to the stator assembly such that no sliding contact or rolling is made between the armature and the suspension system, cutting power to the stator assembly, and absorbing kinetic energy of the armature movement, by the magnetic damping system, when power is cut to the linear motor.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
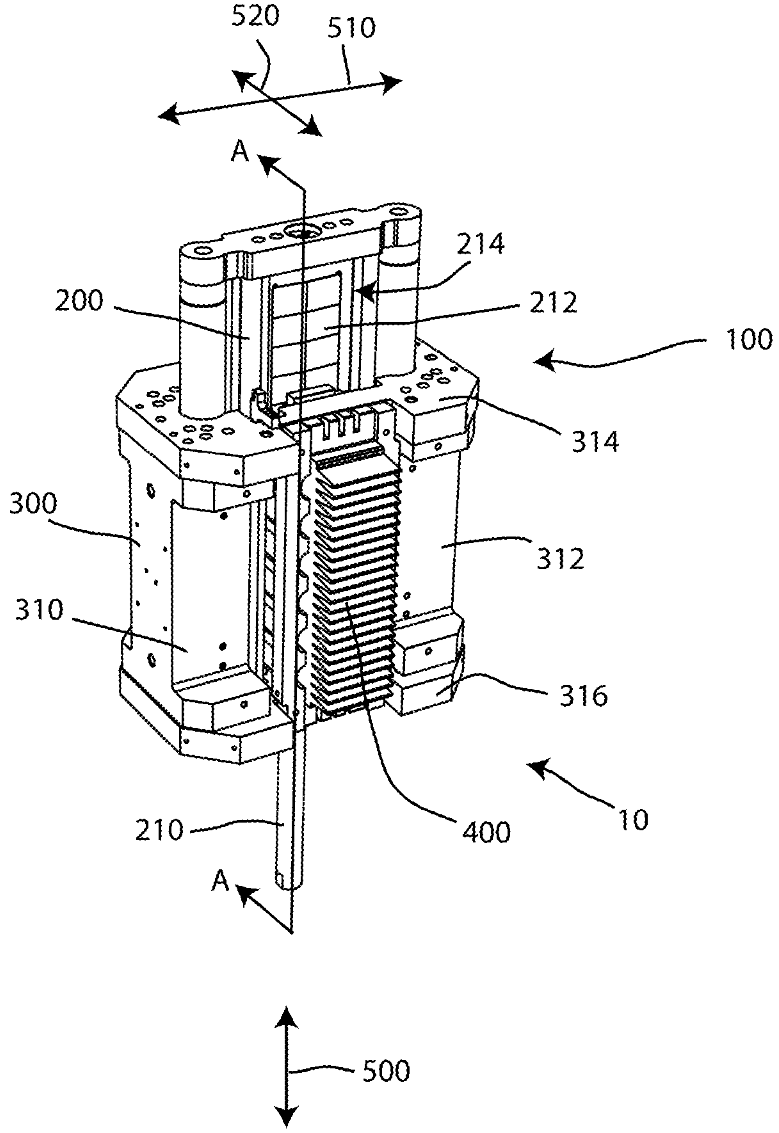
FIG. 1 depicts a perspective view of a linear motor, in accordance with one embodiment.

Embodiments of the present invention provide numerous advancements within the art of testing systems, and more particularly frictionless material handling systems. Herein, frictionless material testing systems are material testing systems configured to operate without contact (sliding, rolling, or the like) between: A) a moving portion (such as an armature) that is coupleable to a material under test; and B) a suspension system that supports the moving portion. Material testing systems, including the frictionless material testing systems described herein, may be configured to place a back and forth linear force and/or motion on a material, device, apparatus, or other object under test. Frictionless material testing systems have been found to have superior reliability, sensitivity, and cleanliness compared to systems that operate with sliding or rolling contact.

Prior art frictionless material testing systems have traditionally been limited in stroke range because the known concept for creating a controlled movement between the moving portion coupled to a test specimen and the suspension system required attaching a magnet carrier between flexible suspension components. When one or more magnets held by the magnet carrier were subjected to magnetic fields created by a single-phase linear motor, the flexible suspension components would bend. This arrangement was frictionless (i.e. the bending flexible suspension components did not impart any contact-based friction) but the movement range was limited by the material properties of the flexible suspension components.

The present invention provides for a frictionless material testing system with increased stroke range. Present systems described herein do not require any flexible suspension components to be directly connected between the armature and the suspension system. Rather, embodiments of the present invention include an armature that moves relative to a suspension system that is not directly connected with any flexible suspension support.

Embodiments of the present invention include a material testing system that includes a multi-phase linear motor having a stack of a plurality of cores configured to provide for a desired longer stroke distance. For example, the present invention includes a material testing system that includes a three-phase linear motor where each phase of the motor controls one or more windings or coils in a stack of coils. The multiple phases may provide for control of an armature over a larger vertical stroke distance than would be otherwise achievable with a single-phase motor.

Embodiments described herein include a frictionless material testing system having an armature that is supported by an air bushing suspension system for controlling the movement of the armature across a large stroke distance without sliding friction. In the event that the armature is powered by a linear motor, the air bushing suspension system is configured to prevent bending or torsion of the armature caused by magnetic attraction and maintain the distance between the armature and one or more stator assemblies.

Embodiments of the present invention further include a frictionless material testing system having a magnetic armature for integration with a linear motor having a stator assembly that includes one or more stacks of coils for moving the magnetic armature. Embodiments of the invention include employing an array of flat tile magnets, disposed in a skewed manner. Magnetic armatures described herein further include a magnet array that extends through a magnet frame so that the magnets are exposed on two opposing sides or surfaces of the armature, each of the two opposing sides or surfaces being proximate respective stator coil stacks.

Further described herein is a frictionless material testing system having stopping or braking system that includes a magnetic damping system for providing damping when the frictionless material testing system is stopped. Embodiments include using electromagnetic force generated by movement of an armature of the system to generate a force that opposes movement and slows the armature. In embodiments using a multi-phase linear motor, embodiments of the frictionless material testing system include the system being configured to cut or short power to each phase at the same time.

Still further described cooling approaches for cooling a linear motor of a frictionless material testing system. Cooling systems described herein utilize recycled air that is supplied to air bushings of a suspension system to cool components of a linear motor, such as windings or coils thereof. Other novel approaches to embodiments of cooling systems of the present invention include utilizing coil bobbins having fins for optimizing heat removal, and heat pipes extending from gaps located between windings of a coil stack, and additional cooling fins attached thereto.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

Referring now to the drawings, FIG. 1 depicts a perspective view of a materials testing device 10 that includes a linear motor 100, in accordance with one embodiment. The linear motor 100 is shown including an armature 200, a suspension system 300, and a stator assembly 400. The armature 200 includes an output shaft 210 extending from a bottom end that is mechanically coupleable to a test specimen (not shown). The armature 200, and thereby the output shaft 210, is configured to be moved back and forth by operation of the linear motor 100 along an axis of movement 500, as described herein. The stroke length of the armature 200 may be greater than 70 mm, in one embodiment. In other embodiments, the stroke length of the armature 200 may be greater than 80 mm, 90 mm, or 100 mm. The materials testing device 10 may be configured with any necessary stroke length to properly perform testing on a given test specimen or material.

The suspension system 300 is configured to support the armature 200 and control the movement of the armature 200 relative to the stator assembly 400 in a manner that does not have any contact, such as sliding or rolling contact, between the armature 200 and the suspension system 300. By moving along the axis of movement 500, the armature 200 may be configured to apply force to the test specimen, either inducing motion or mechanical stress (or both) along the axis of movement 500.

The linear motor 100, the armature 200, the suspension system 300, and the stator assembly 400 will be shown in more detail in subsequent figures. The mechanical attachment between the output shaft 210 and the test specimen may be conventional. For example, the configuration of the test specimen may be dependent on the specific materials test to be performed. The test specimen may be considered any material, component, jig, fixture, device, or the like.

The armature 200 may be a magnetic device having a magnet array 212 located or otherwise disposed within a magnet frame 214. While not shown, the magnet array 212 extends through a magnet frame 214 onto the opposite side of the armature 200. While only one side of the armature 200 is shown, the armature 200 may be geometrically mirrored or substantially mirrored about a first plane of symmetry that extends parallel to both the axis of movement 500 and a horizontal axis 510 that is perpendicular to the axis of movement, as shown. The armature 200 may also be both magnetically and geometrically mirrored or substantially mirrored about a second plane of symmetry that extends parallel with the axis of movement 500 and a second horizontal axis 520 that is perpendicular to the axis of movement and is further perpendicular to the first axis of movement.

The armature 200 is held into place by the suspension system 300 which includes a first side frame 310 and a second side frame 312. The first and second side frames 310, 312 are configured to support the armature 200. The suspension system 300 may be a structural body (e.g. the first and second side frames 310, 312) including at least one opening (e.g. first and second armature openings 395, 397 shown in FIGS. 6 and 7) for receiving the armature 200 therein, other embodiments are contemplated. Coil stacks within the stator assembly 400 are located between the first side frame 310 and the second side frame 312. The suspension system 300 still further includes a top mounting plate 314 and a bottom mounting plate 316 for attaching, connecting or otherwise mounting the first and second side frames 310, 312 and the stator assembly 400.

Figure 2:
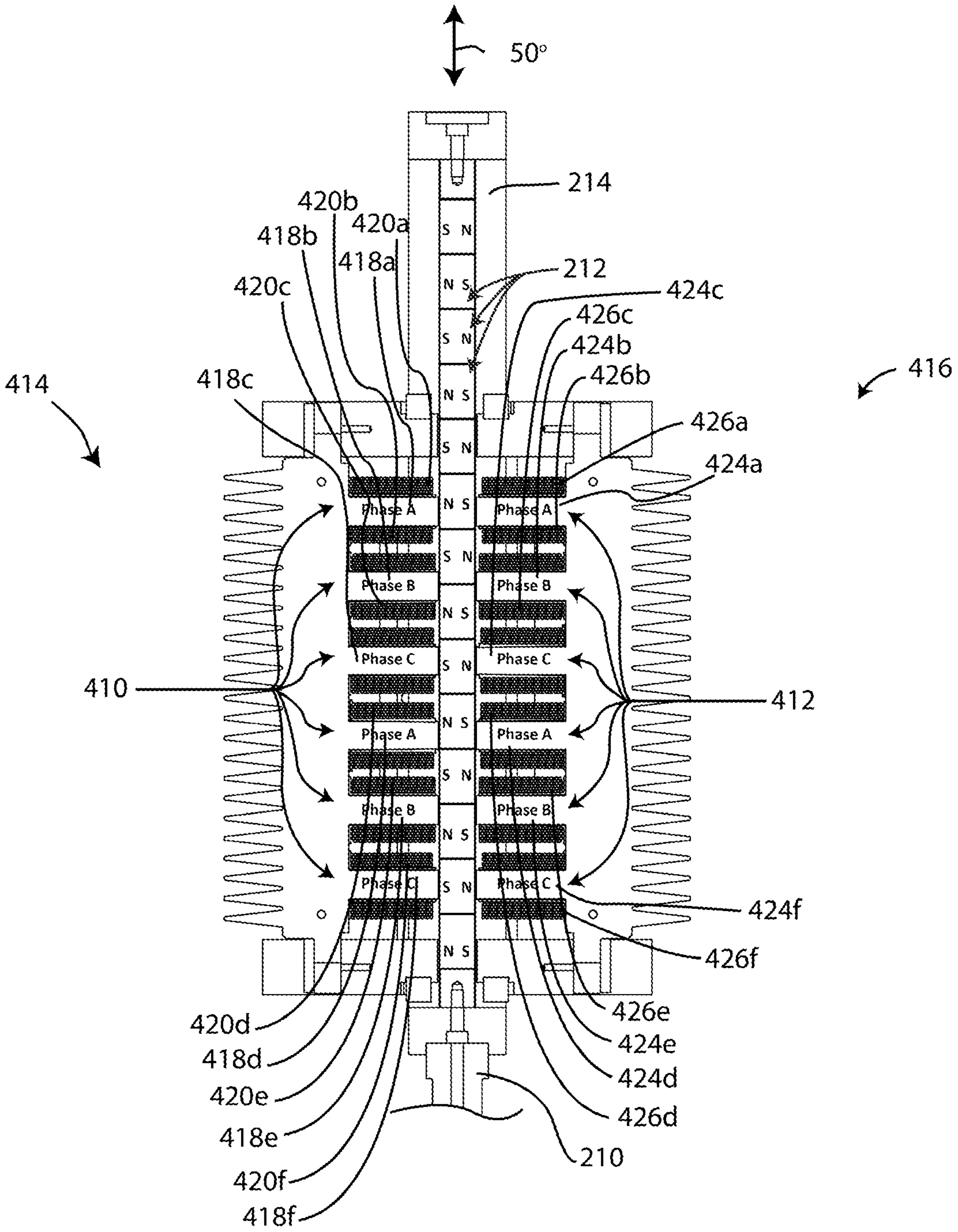
FIG. 2 depicts a cutaway view of the linear motor of FIG. 1 taken at arrows A-A, in accordance with one embodiment.

In the embodiment shown, the linear motor 100 is a three-phase linear motor. FIG. 2 depicts a cutaway view of the linear motor 100 of FIG. 1 taken at arrows A-A, in accordance with one embodiment. The linear motor 100 includes a first coil sub-assembly 414 having a first coil stack 410 and a second coil sub-assembly 416 having a second coil stack 412 housed within the stator assembly 400 that are proximate two opposing sides of the magnet array 212 exposed on the opposite sides of the magnet frame 214 of the armature 200. When subjected to electrical power, the coil stacks of the stator assembly 400 provide for movement of the magnetic armature 200.

The first coil sub-assembly 414 includes a first laminated magnetic core 422 having six separate poles **418*a*, 418*b*, 418*c*, 418*d*, 418*e*, 418*f* upon which six separate windings 420*a*, 420*b*, 420*c*, 420*d*, 420*e*, 420*f* are wrapped, respectively, creating the first coil stack 410. Likewise, the second coil sub-assembly 416 includes a second laminated magnetic core 422 having six separate poles 424*a*, 424*b*, 424*c*, 424*d*, 424*e*, 424*f* upon which six separate windings 426*a*, 426*b*, 426*c*, 426*d*, 426*e*, 426*f* are wrapped, respectively, creating the second coil stack 412. As shown, a first phase A is connected to the top windings 420*a*, 426*a* of each of the first and second coil stacks 410, 412, along with the fourth windings 420*d*, 426*d* from the top. A second phase B is connected to the second windings from the top 420*b*, 426*b* of each of the first and second coil stacks 410, 412, along with the fifth windings 420*e*, 426*e* from the top. A third phase C is connected to the third windings from the top 420*c*, 426*c* of each of the first and second coil stacks 410, 412, along with the sixth windings 420*f*, 426*f*** from the top.

As shown, each of the magnets of the magnet array 212 includes a reverse or opposite polarity to the immediately adjacent magnets. In particular, the magnet array 212 includes fourteen rows of two magnets each. Other embodiments may include more or less than fourteen rows of two magnets each. For example, a shorter stroke version of the linear motor 100 may include thirteen, twelve, eleven, ten, or less pairs of magnets. A longer stroke version of the linear motor may include fifteen, sixteen, seventeen, eighteen, nineteen, twenty or more pairs of magnets. This three-phase configuration creates magnetic fields that interact with the magnet array 212 of the armature 200, causing the armature 200 to move the up and down (i.e. back and forth) along the axis of movement 500 with a distance. The magnet array 212 may be disposed as close within a predetermined gap tolerance to each of the first and second coil stacks 410, 412. The gap span may be maintained with a tight tolerance to prevent the magnet array 212 from being more attracted to one or the other of the first and second coil stacks 410, 412 during operation as much as possible. While it may not be possible to create perfectly equal gaps between each side of the magnet array 212 and the coil stacks 410, 412, the lateral stiffness of the suspension system 300 may be configured to support generated lateral forces by slightly unequal gaps. The lateral stiffness of the suspension system 300, including the air bushings thereof (as described in more detail herein below) may be high enough to counteract any lateral forces caused by unequal gaps.

While the embodiment shown includes a three-phase linear motor with a three-phase stator assembly 400, the principles described herein related to the armature 200, the suspension system 300, and the stator assembly 400 may be incorporated into single phase linear motors, or any other multi-phase linear motor. While a three-phase system was discovered to be capable of achieving a higher stroke length than a single-phase system, in applications where stroke length is not critical, single phase linear motors may be employed without departing from various embodiments of the invention.

Figure 3:
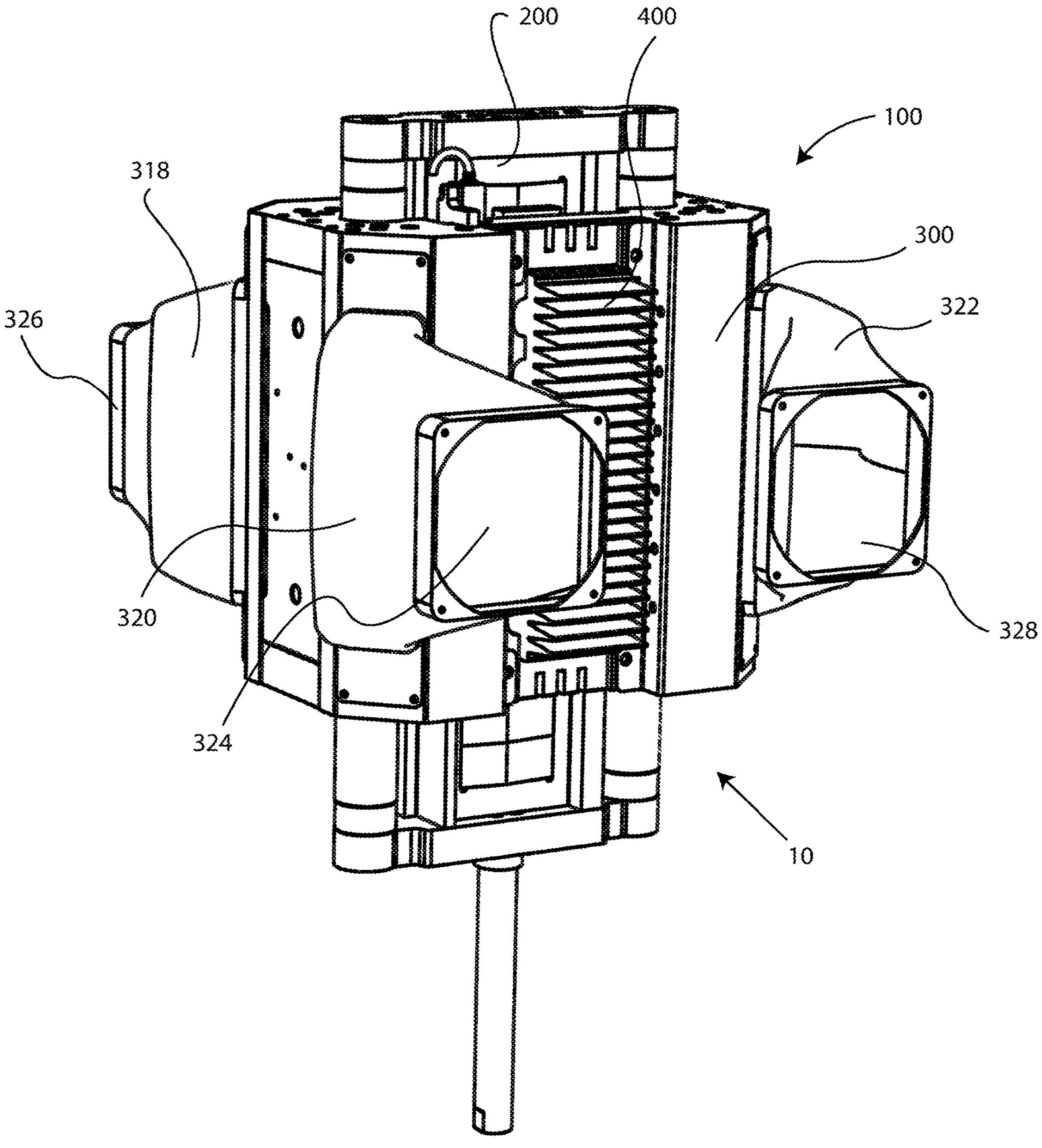
FIG. 3 depicts a perspective view of the linear motor of FIG. 1 with cooling ducts shown, in accordance with one embodiment.

FIG. 3 depicts a perspective view of the linear motor 100 of FIG. 1 with cooling ducts 318, 320, 322 shown, in accordance with one embodiment. The cooling ducts 318, 320, 322 may be removably attachable features to each of the first side frame 310 and the second side frame 312 of the suspension system 300. As shown a first cooling duct 318 is attached to a front side of the first side frame 310, and a second cooling duct 320 is attached to a back side of the first side frame 310. Similarly, a third cooling duct 322 is shown attached to a front side of the second side frame 312. While hidden, a fourth cooling duct may be attached to a back side of the second side frame 312. Each of the cooling ducts 318, 320, 322 may provide a passageway for air to move therethrough. Further fans 324, 326, 328 are shown attached to each cooling duct 318, 320, 322, respectively, to facilitate circulation, circulation and/or blowing of air through the cooling ducts 318, 320, 322.

Figure 4:
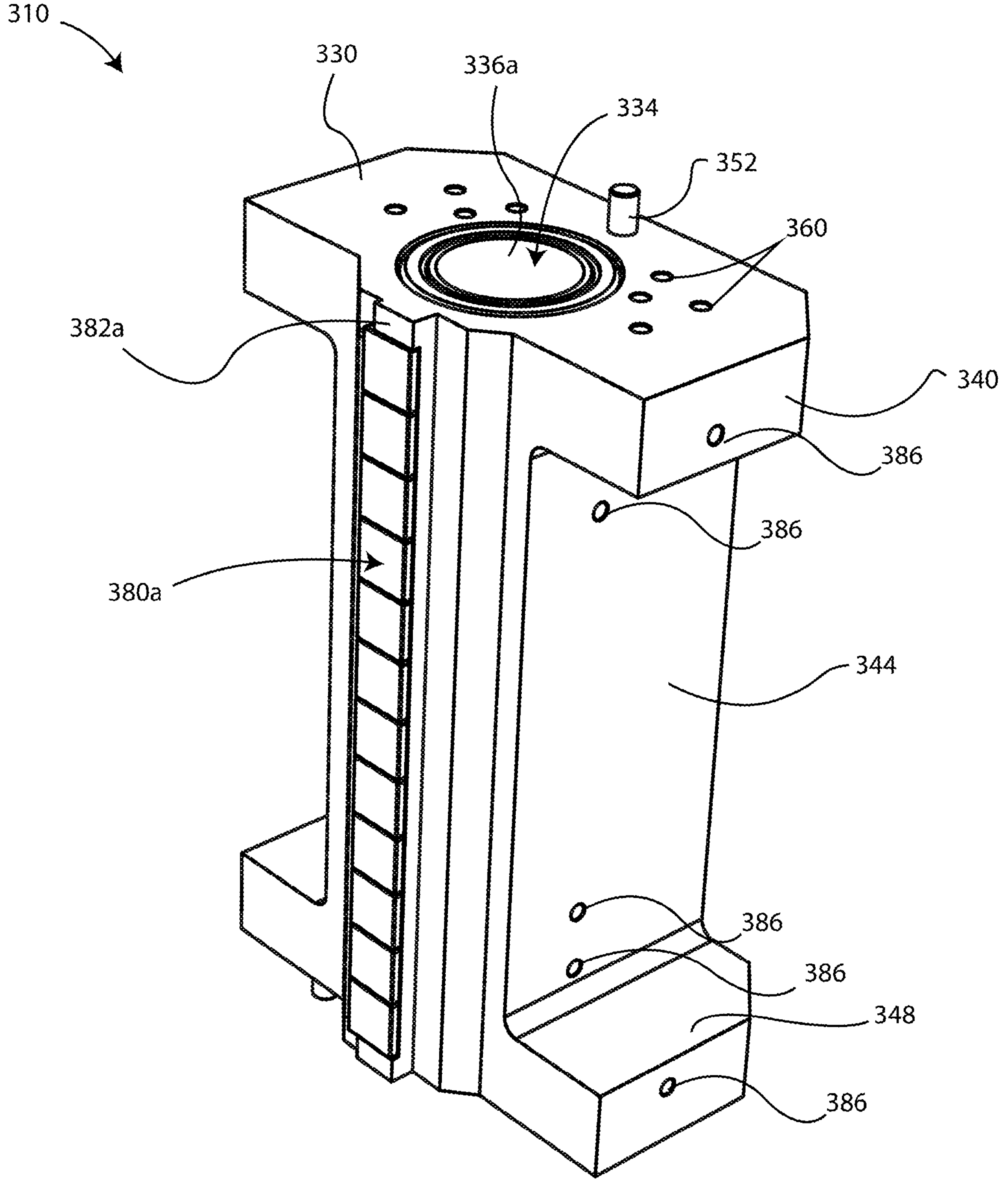
FIG. 4 depicts a perspective view of a first side frame of the linear motor of FIGS. 1 and 3 revealing an upper face, in accordance with one embodiment.
Figure 5:
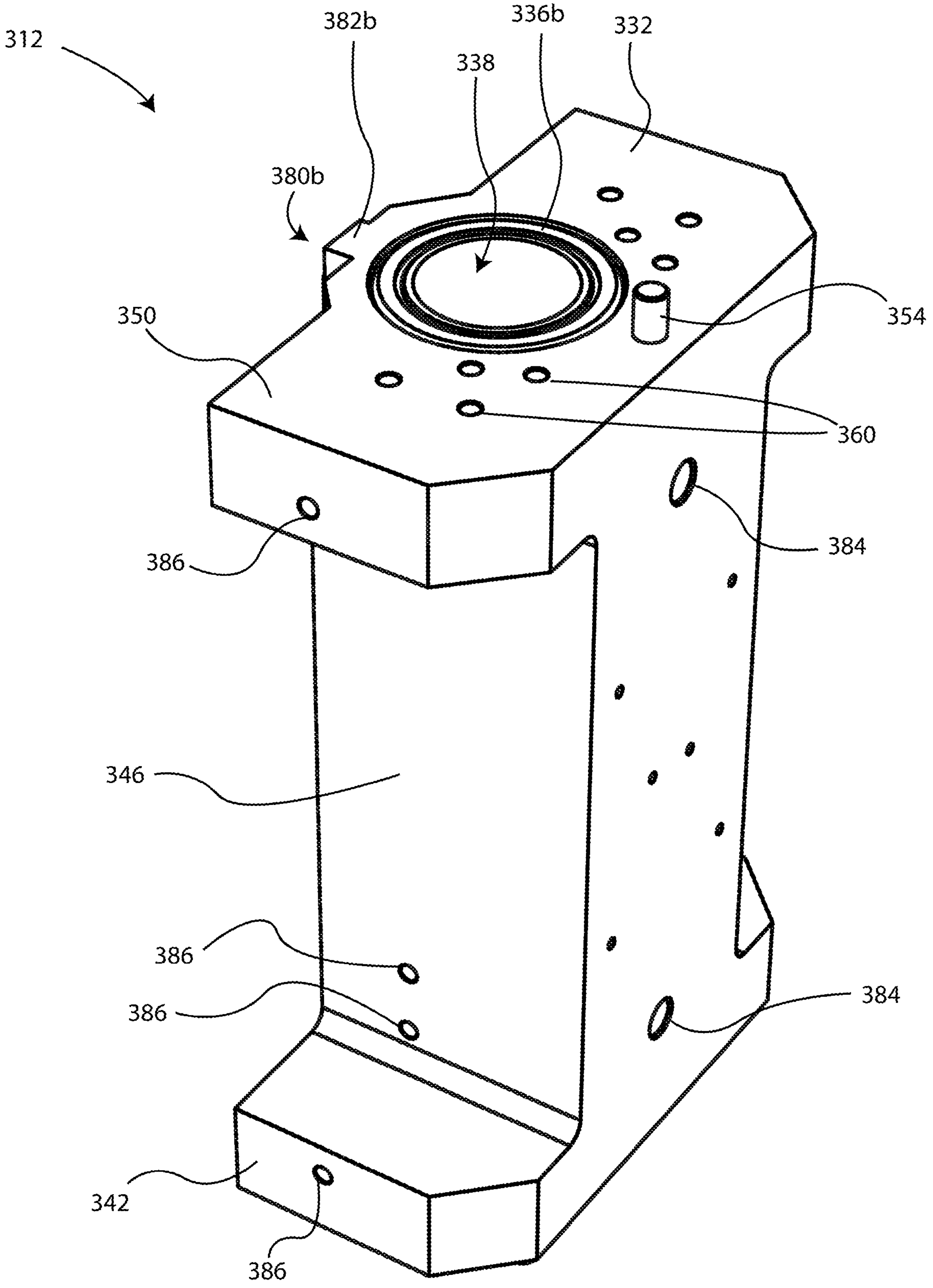
FIG. 5 depicts a perspective view of a second side frame of the linear motor of FIGS. 1 and 3 revealing a lower face, in accordance with one embodiment.

Referring now to FIGS. 4 and 5, FIG. 4 depicts a perspective view of a first side frame 310 of the linear motor 100 of FIGS. 1 and 3 revealing an upper face 330, in accordance with one embodiment. FIG. 5 depicts a perspective view of a second side frame 310 of the linear motor 100 of FIGS. 1 and 3 revealing a lower face 332, in accordance with one embodiment. The first and second side frames 310, 312 may be mirrored components having the same dimensions and features. In other embodiments, the first and second side frames 310, 312 may each include one or more unique features, dimensions or the like (not shown).

The first and second side frames 310, 312 of the suspension system 300 may be dimensioned to support the flow of air from the ducts 318, 320, 322 and into gaps located between each of the windings **420*a*, 420*b*, 420*c*, 420*d*, 420*e*, 420*f*, 426*a*, 426*b*, 426*c*, 426*d*, 426*e*, 426*f* of the stator assembly 400 and/or across the magnets of the magnet array 212. To accomplish this, the first and second side frames 310, 312 may each include an I-shaped cross section. Thus, the first and second side frames 310, 312 each include an upper portion 340, 342, respectively, and middle portion 344, 346, respectively, and a lower portion 348, 350, respectively. Referring back to FIG. 3, the cooling ducts 318, 320, 322 are attached between the top and bottom of the I shaped cross sections such that the first and second side frames 310, 312 define an air passageway from the cooling ducts 318, 320, 322 to the stator assembly 400 and/or magnet array 212. In other embodiments, the shape of the first and second side frames 310, 312** may be more solid than the embodiment shown, and may include openings, slots, ports, or the like, to facilitate airflow.

Referring still to FIGS. 4 and 5, the first side frame 310 includes a first opening 334 within which an air bushing **336*a* is disposed, while the second side frame 312 includes a second opening 338 within which another air bushing 336*b* is disposed. The first and second openings 334, 338 are cylindrical openings having a circular cross section configured to receive the cylindrical air bushing 336*a*, 336*b* (hereinafter generally air bushings 336), respectively. However, in other embodiments, other shaped openings are contemplated. For example, a triangular or rectangular opening may be employed within the first and second side frames 310, 312 with an array of opposed flat bearings, rather than utilizing the cylindrical air bushings 336**, without departing from the scope of various inventive concepts described herein.

Each of the first and second side frames 310, 312 further include a magnetic damping system configured to absorb kinetic energy from the movement of the armature 200 when power is cut to the linear motor 100. Specifically, the magnetic damping system is shown as two arrays of magnets **380*a*, 380*b*, one disposed on each of the first and second side frames 310, 312 parallel to the axis of movement 500 of the armature 200. In addition to absorbing kinetic energy when power is cut, the magnetic damping system may be configured to reduce instability and make the linear motor 100** more stable. For example, during normal operation, the magnetic damping system may be tuned by adjusting the gaps or using different numbers or types of magnets to provide an optimal amount of damping to improve system control.

Figure 6:
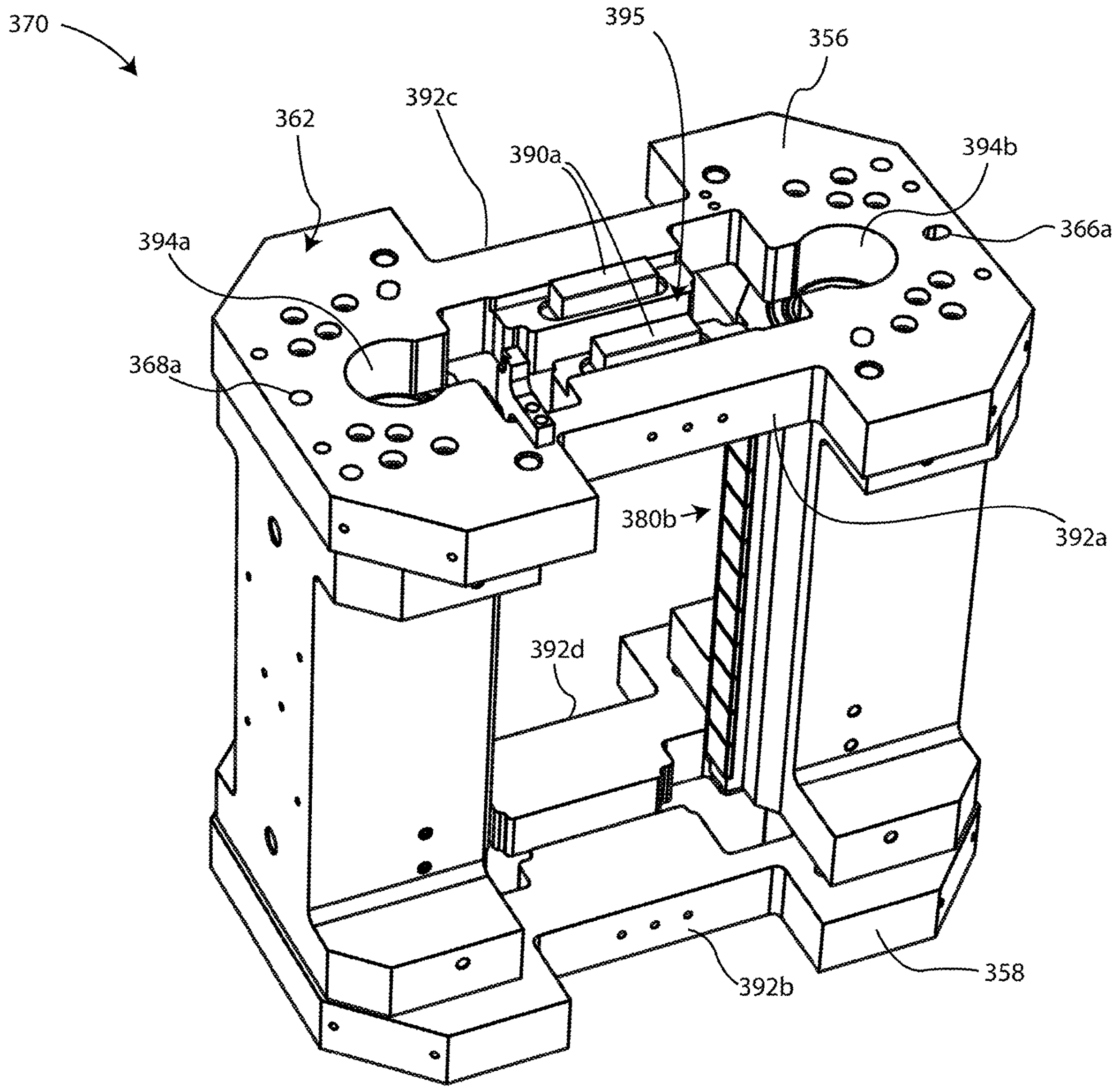
FIG. 6 depicts a perspective view of a frame sub-assembly including the first and second side frames of FIGS. 4 and 5 connected between upper and lower plates oriented to reveal an upper side, in accordance with one embodiment.

While FIG. 4 shows clearly a first array of magnets **380*a* disposed on the first side frame 310, the second side frame 312 includes a second array of magnets 380*b* (shown more clearly in FIG. 6). Each magnet in each of the arrays of magnets 380*a*, 380*b* is shown as a flat tile permanent neo magnet. These arrays of magnets 380*a*, 380*b* are separate from the magnet array 212 utilized by the armature 200 to create movement of the armature 200 by the linear motor 100. Each of the arrays of magnets 380*a*, 380*b* may be located proximate a conductive non-magnetic surface of the armature 200 that extends parallel to the axis of movement 500 of the armature 200 when the linear motor 100 is assembled and operational. A small gap (e.g. less than 1 cm, less than 0.5 cm, or less than 0.25 cm) exists between each of the arrays of magnets 380*a*, 380*b* and the conductive non-magnetic surface of the armature 200 to which they are located proximate (shown more clearly in FIG. 10 and described herein below). The first and second arrays of magnets 380*a*, 380*b* may be configured to utilize eddy currents caused by the motion of the conductive non-magnetic surface of the armature 200 to resist the movement, thereby creating a damping effect on the moving armature during a stop condition. The number of magnets shown on each of the first and second array of magnets 380*a*, 380*b* is twelve, although more or less magnets may be deployed. Each of the arrays of magnets 380*a*, 380*b* includes a single column of magnets vertically disposed on a magnet holding surface 382*a*, 382*b* of each of the first and second side frames 310*a*, 310*b*, respectively. The magnet holding surface 382*a*, 382*b* may be a vertically dimensioned projection that extends from a surface of each of the first and second side frames 310*a*, 310*b* that is proximate the armature 200 when the linear motor 100** is assembled and operational.

The upper and lower surfaces of the first and second side frames 310, 312 may each include one or more alignment pins 352, 354. For example, the upper surface 330 of the first side frame 310 includes a first alignment pin 352 to facilitate attachment between the first side frame 310 and an upper plate 356. The lower surface 332 of the second side frame 312 is shown including a second alignment pin 354 to facilitate attachment between the second side frame 312 and a lower plate 358. While only the upper surface of the first side frame 310 is shown, and the lower surface 332 of the second side frame 312 is shown, it should be understood that alignment pins may also be included on the lower surface of the first side frame 310 and the upper surface of the second side frame 312. The upper and lower surfaces of each of the first and second side frames 310, 312 may further include openings 360 which may be, for example, threaded for receiving an attachment mechanism such as a threaded screw, bolt or the like, for attaching the first and second side frames 310, 312 to the upper and lower plates 356, 358.

Figure 7:
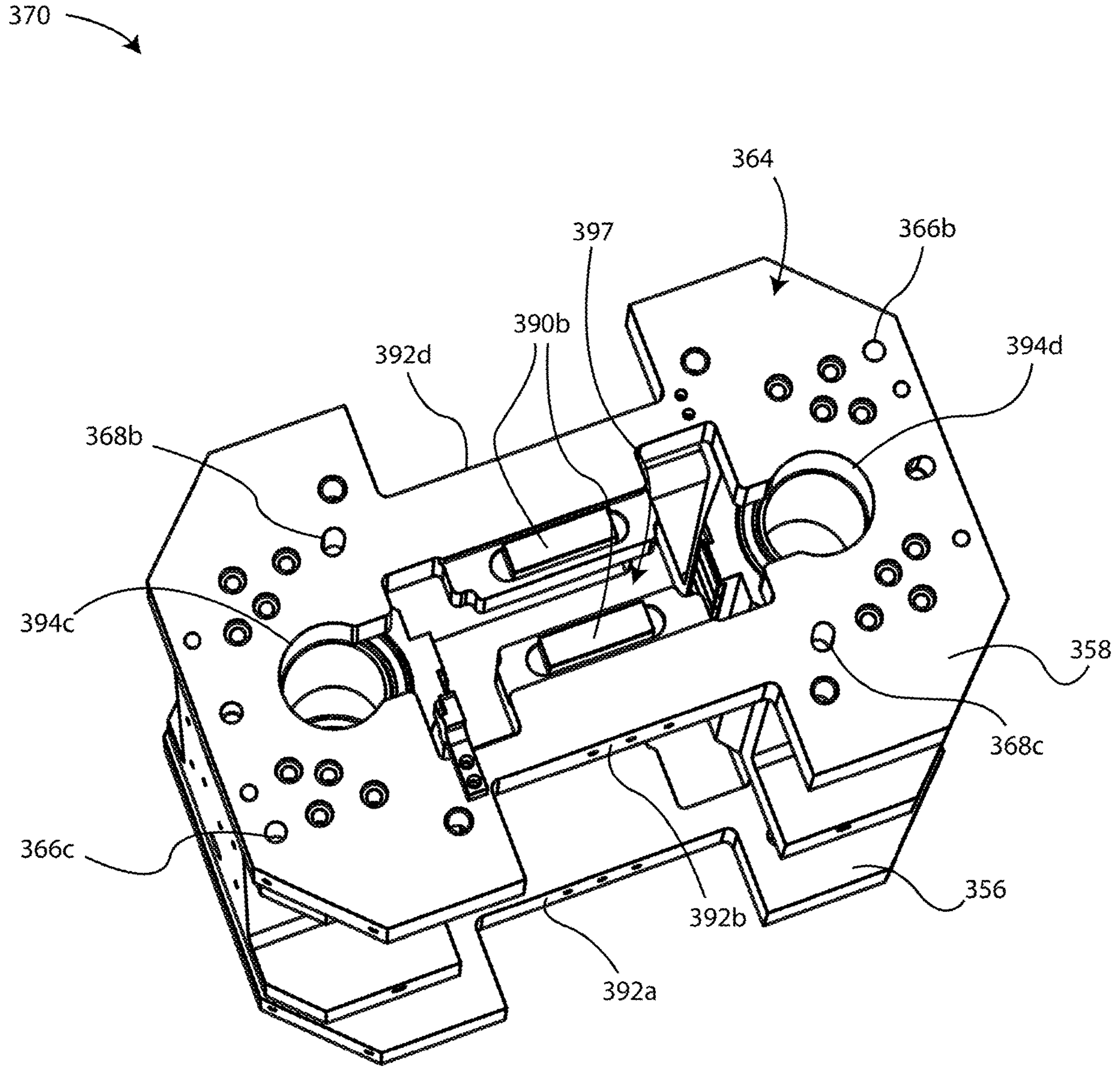
FIG. 7 depicts a perspective view of the frame sub-assembly of FIG. 6 oriented to reveal a lower side, in accordance with one embodiment.

The first and second side frames 310, 312 each include two air supply openings 384, one for each air bushing 336 configured to be disposed within the first opening 334 and the second opening 338, respectively. The air supply openings 384 may be configured to supply forced air from an air source (not shown) into the air bushings 336. The air supply openings 384 may be configured to receive the air directly, or may alternatively be configured to receive an tube, pipe or other device configured to transmit air therethrough. The first and second side frames 310, 312 further includes three pressure relief openings 386 for each bushing configured to be disposed within the first opening 334 and the second opening 338. The air supply openings 384 and the pressure relief openings 386 are shown in FIG. 7 and described in more detail herein below.

FIG. 6 depicts a perspective view of a frame sub-assembly 370 including the first and second side frames 310, 312 of FIGS. 4 and 5 connected between upper and lower plates 356, 358 oriented to reveal an upper side 362, in accordance with one embodiment. FIG. 7 depicts a perspective view of the frame sub-assembly 370 including the first and second side frames of FIGS. 4 and 5 connected between upper and lower plates 356, 358 oriented to reveal a lower side 364, in accordance with one embodiment. The upper and lower plates 356, 358 are configured to attach the first and second side frames 310, 312 together, and also provide an attachment location for attaching the first and second coil stacks 410, 412 of the stator assembly 300. Thus, the upper and lower plates 356, 358 may include various openings which may be threaded, for example, to receive attachment screws, bolts, or other mechanisms for assembling the frame sub-assembly 370, and further for attaching the frame sub-assembly 370 to other components of the material test system 10 (not shown).

The upper and lower plates 356, 358 may each include a plurality of x,y location openings 368*a*, 368*b*, 368*c* and clocking slots 366*a*, 366*b*, 366*c* to facilitate assembly. The x,y location openings 368*a*, 368*b*, 368*c* may be circular openings to receive a circular pin and may prevent movement between the plates 356, 358 and the side frames 310 312 to which the pins extend through at their location. The clocking slots 336*a*, 336*b*, 336*c* may be elongated along a direction of movement to provide some movement between the plates 356, 358 and the side frames 310, 312 to which a pin extends though at their location.

In order to assemble linear motor 100, and the frame sub-assembly 370 thereof, after the armature 200 is placed within the frame sub-assembly 370, pins may be inserted into each of the x,y location openings 368*b*, 368*c* and the clocking slots 336*b*, 336*c* of the lower plate 358. Then pins may be inserted into the x,y location opening 368*a* and the clocking slot 366*a* of the upper plate 356. Once pins have been placed through the clocking slots 336*a*, 336*b*, 336*c* and the x,y location openings 368*a*, 368*b*, 368*c*, the method of assembling the linear motor 100 includes energizing the air bushings 336 within the first and second vertical openings 334, 338. This air pressure, in conjunction with the limited movement provided by the clocking slots 366*a*, 366*b*, 366*c*, may align the system after which the upper and lower plates 356, 356 may be fully tightened with bolts, screws, or the like.

The upper and lower plates 356, 358 may each include the same dimensions and features. For example, the upper and lower plates 356, 358 may each include two armature shaft openings 394*a*, 394*b*, 394*c*, 394*d* configured to receive armature shafts therein. When assembled, the first opening 334 of the first side frames 310 aligns with the armature shaft openings 394*a*, 394*c* and the second opening 338 of the second side frame 312 aligns with the armature shaft openings 394*b*, 394*d* to provide for left and right collective vertical openings that each extend through each of the upper plate 356, the respective first and second side frames 310, 312, and the lower plate 358. The collective vertical openings each extend along an axis that is parallel to the axis of movement 500.

Extending between the openings 394*a*, 394*b* of the upper plate 356 is a first armature opening 395, and extending between the openings 394*c*, 394*d* of the lower plate 358 is a corresponding second armature opening 397. The armature openings 395, 397 may be configured to receive the armature therein and provide for free movement of the armature within. Upper bump stops 390*a* are shown extending from the upper plate 356 and lower bump stops 390*b* extend from the lower plate 358. The bump stops 390*a*, 390*b* may provide a physical boundary for the motion of the armature 200. The bump stops 390*a*, 390*b* may be made of a soft elastomer material such as FKM elastomer, or the like, to slow decelerations.

The upper plate 356 is shown including first and second stack mounting surfaces 392*a*, 392*b*. Likewise, the lower plate 358 is shown including third and fourth stack mounting surfaces 392*c*, 392*d*. The stack mounting surfaces 392*a*, 392*b* provide surfaces upon which the first coil stack 410 is mounted. Likewise, the stack mounting surfaces 392*c*, 392*d* provide surfaces upon which the second coil stack 412 is mounted. Thus, the stack mounting surfaces 392*a*, 392*b*, 392*c*, 392*d* each include a plurality of openings, which may be configured with threads to receive screws, bolts or the like. The dimensions at which the stack mounting surfaces 392*a*, 392*b*, 392*c*, 392*d* extend into the upper and lower plates 356, 358 may be machined with precision to provide for the desired gap distance between the moving armature 200 and the first and second coil stacks 410, 412.

Figure 8:
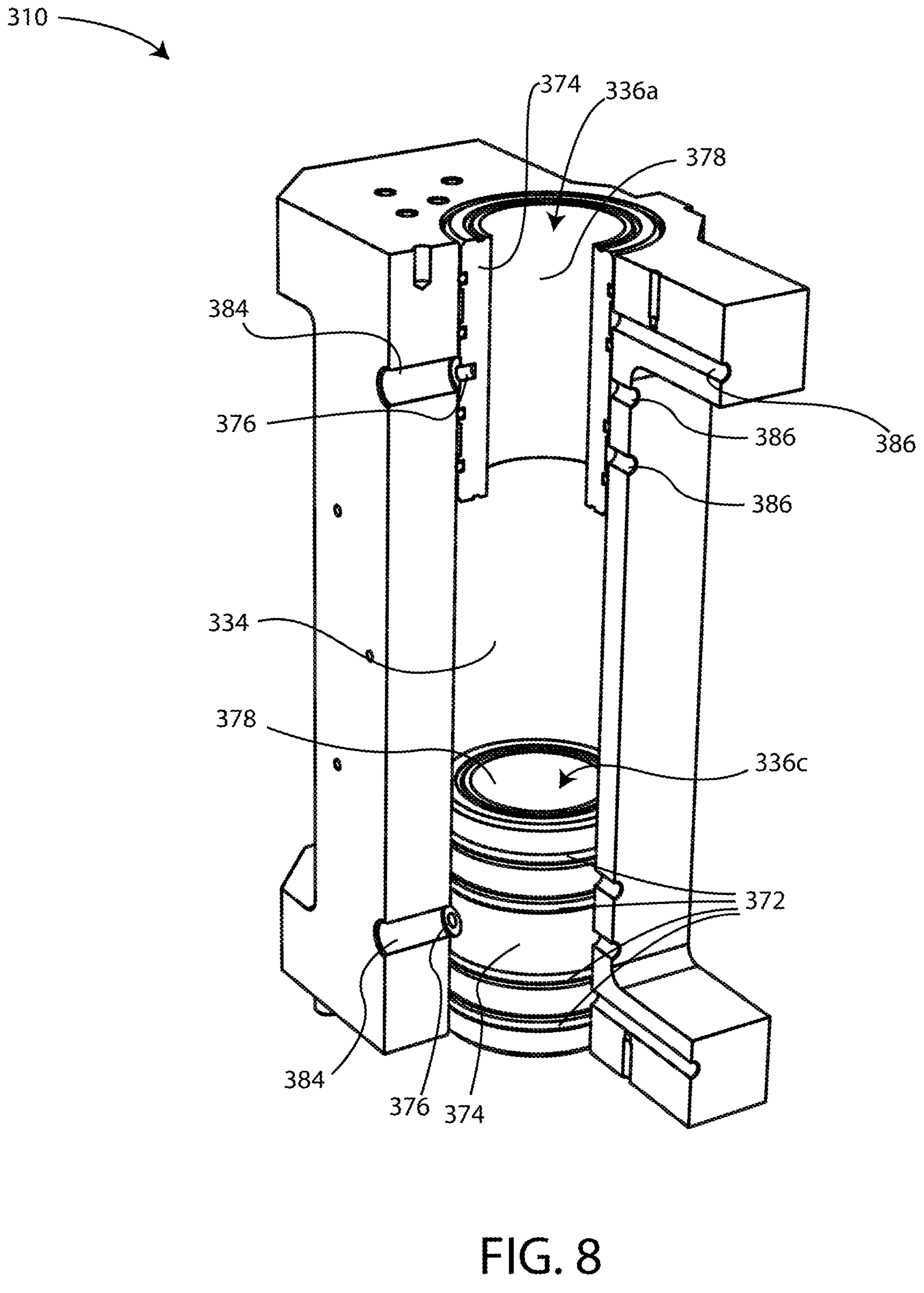
FIG. 8 depicts a perspective cutaway view of the first side frame of FIG. 4 showing two air bushing disposed within a vertical opening, in accordance with one embodiment.

FIG. 8 depicts a perspective cutaway view of the first side frame 310 showing two air bushings 336*a*, 336*c* disposed within the vertical opening 334 of the first side frame 310, in accordance with one embodiment. While only the first side frame 310 is shown cutaway in FIG. 8 to reveal the two air bushings 336*a*, 336*c* within the vertical opening 334, the second side frame 312 may further include two air bushings 336 in the same manner. Thus, the description of the air bushings 336*a*, 336*c* to follow is applicable to the two air bushings 336 located within the second side frame 312.

As shown, the first air bushing 336*a* of the first side frame 310 is located proximate a first upper end of the opening 334 while the second air bushing 336*b* is located proximate a second lower end of the opening 334. The air bushings 336*a*, 336*b* may each be installed within the opening 334 in a compliant manner such that some movement between the air bushings 336*a*, 336*b* and the frame sub-assembly 370 is permitted. This compliant relationship may be provided by the air bushings 336*a*, 336*b* being inserted within the opening 334 in an interference fit or press fit. Further, the air bushings 336*a*, 336*b* are each shown including a plurality of o-rings 372 which may be made of a compliant elastomeric material and provide for some compliance between the air bushings 336*a*, 336*b* and the opening 334 (and thereby the frame sub-assembly 370). The air bushings 336*a*, 336*b* may each be installed by insertion into the opening 334 by hand, and may be removed, for example for maintenance, by hand.

The air bushings 336*a*, 336*b* each have a hollow cylindrical shape. The air bushings 336*a*, 336*b* each include an outer body 374 and an inner body 378 made of different materials. The inner body is a porous body that is permeable to air while the outer body 374 is impermeable to air, other than through an air receiving port opening 376. Air is thereby received to each of the air bushings 336*a*, 336*b* through the respective air receiving port openings 376. This air is then transported through the porous inner body 378. Because the outer body 374 is impermeable to air and prevents the air received by the air receiving port openings 376 from escaping through the outer body 374, received air is forced to escape only through the porous inner body 378, thereby creating an air pressure between the porous inner body 378 and a shaft of the armature received therein. The porous inner body 378 includes many (thousands, millions, etc) sub-micron holes that create permeability to air in the material. When the air bushings 336*a*, 336*b* receive air through the air receiving port openings 376, the air bushings 336*a*, 336*b* may be configured to provide full 360-degree non-contact motion for the shaft of the armature received therein as the air escapes the body of the air bushings 336*a*, 336*b* through the inner body 378.

As shown in the cutaway, the air supply openings 384 of the first side frame 310 extend through the body of the frame and are directly aligned with the respective receiving port openings 376. The pressure relief openings 386 also extend through the body of the frame and are aligned with the space in between each of the four o-rings 372 on the bushing. The pressure relief openings 386 in the body of the first side frame 310 may facilitate installation of the air bushings 336*a*, 336*b* and prevent any buildup of air pressure between the outer body 374 of the air bushings 336*a*, 336*b* and the inner wall of the vertical opening 334 of the first side frame 310. Additional openings may be provided from within the vertical opening 334 of the first side frame 310 in order to recycle the air that is introduced to the bushings 336*a*, 336*b* through the respective receiving port options 376 back into the system for the purposes of cooling at least one of the windings 420*a*, 420*b*, 420*c*, 420*d*, 420*e*, 420*f*, 426*a*, 426*b*, 426*c*, 426*d*, 426*e*, 426*f* or the magnet array 212 of the armature 200.

While the testing device 10 and linear motor 100 is shown including four of the air bushings 336 (two in each of the first and second side frames 310, 312), more or less air bushings may be included if necessary to accommodate for any crashing force caused by magnetic attraction between the armature 200 and the coil stacks 410, 412. For example, some embodiments may only require two air bushings. Other embodiments may require six air bushings (three in each of the vertical openings 334, 338). In another contemplated embodiment, one or more additional air bushings may be configured to surround the test specimen output shaft 210 that extends from the armature 200 to provide for additional suspension support for the system.

Figure 9:
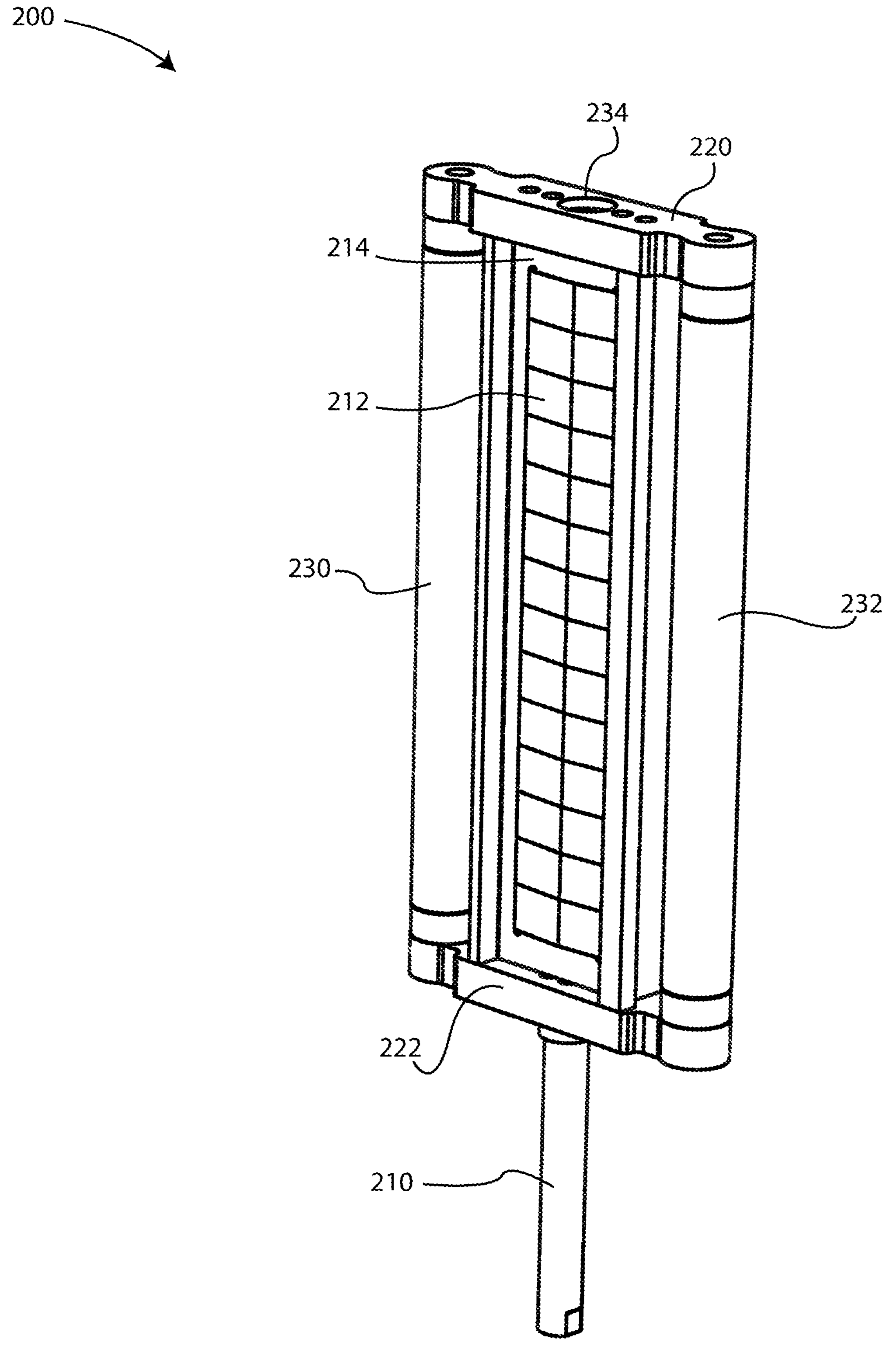
FIG. 9 depicts a perspective view of an armature of the linear motor of FIGS. 1 and 3, in accordance with one embodiment.

FIG. 9 depicts a perspective view of the armature 200 of the linear motor 100 of FIGS. 1 and 3, in accordance with one embodiment. The armature 200 includes the magnet frame 214 with the magnet array 212 extending between a top end plate 220 and a bottom end plate 222 in a direction of the axis of movement 500. The top end plate 220 and the bottom end plate 222 are configured to connect, attach or otherwise assemble the magnet frame 214 and the magnet array 212 to a first side air bushing shaft 230 and a second side air bushing shaft 232. The first and second side air bushing shafts 230, 232 also extend in the axis of movement 500. The first and second side air bushing shafts 230, 232 are shown as cylindrical shafts. The first and second side air bushing shafts 230, 232 have a tight dimensional tolerance to the inner dimensions of the air bushings 336 within the first and second openings The air bushings 336 are configured to provide for the frictionless movement between the armature 200 and the frame sub-assembly 370 of the suspension system 300. The air bushings 336 operate without sliding or rolling friction between the inner surface of the air bushings 336 and the air bushing shafts 230, 232 of the armature 200. When air is forced through the inner body 378 of the air bushings 336, the air bushing shafts 230, 232 of the armature 200 are forced via air to a middle point between in inner surface of the inner body 378. In one embodiment, the air bushing shafts 230, 232 may include a radius between 3 and 5 microns less than the inner radius of the inner surface of the air bushings 336 in order to provide for space between the air bushing shafts 230, 232 and the inner surface of the inner body 378 of the air bushings 336 when the air bushings 336 are receiving airflow and the system is operating. In one embodiment, the air bushing shafts 230, 232 includes a radius of 4 microns less (diameter of 8 microns less) than the inner surface of the air bushings 336. Other dimensions are contemplated to provide for a frictionless and/or contactless movement system between the air bushing shafts 230, 232 and the air bushings 336.

The top and bottom end plates 220, 222 are shown having a greater width than the width of the magnet frame 214. This greater width provides a surface to engage with the bump stops 390*a*, 390*b*. Further, the top and bottom end plates 220, 222 include connection openings 234 for receiving a bolt, screw or other attachment mechanism for connection with the magnet frame 214. Various other connection openings may be provided for receiving other bolts, screws, or the like, for attaching the top and bottom end plates 220, 222 to the air bushing shafts 230, 232 as well. The top and bottom end plates 220, 222 are shown connecting the first and second air bushing shafts 230, 232 to the magnet frame 214 such that a first space extends parallel to the axis of movement 500 between the first air bushing shaft 230 and the magnet frame 214, and likewise such that a second space extends parallel to the axis of movement between the second air bushing shaft 232 and the magnet frame 214. These spaces may be larger than the thickness of the air bushings 336 and the body of the first and second side frames 310 312 that surrounds the vertical openings 334, 338 thereof. Thus, these vertical spaces between the air bushing shafts 230, 323 and the magnet frame 214 enable the armature 200 to remain connected to the suspension system 300 while still allowing vertical movement of the armature 200 with respect to the suspension system 300.

Figure 10:
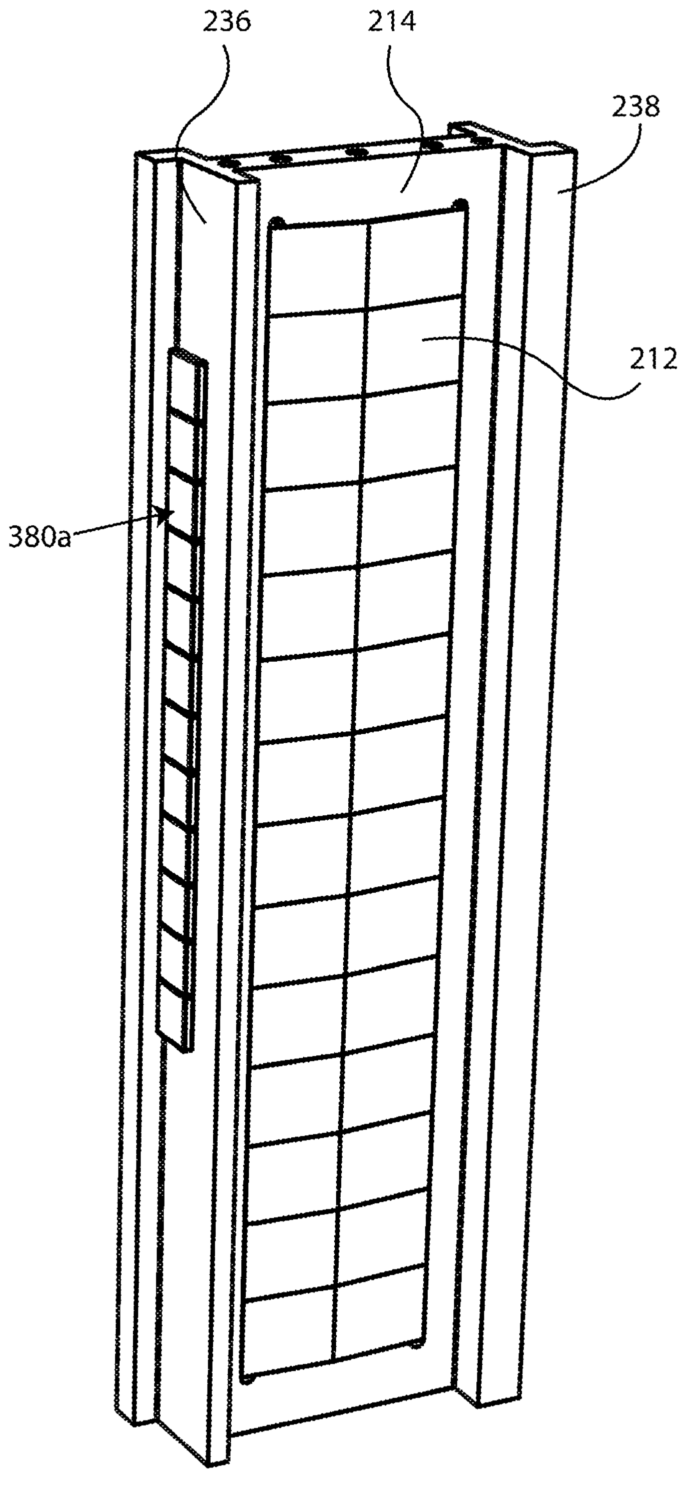
FIG. 10 depicts a perspective view of a magnet frame of the armature of FIG. 9, in accordance with one embodiment.

FIG. 10 depicts the magnet frame 214 of the armature 200 of FIG. 9 prior to assembly with the first and second air bushing shafts 230, 232 and the top and bottom end plates 220, 222, in accordance with one embodiment. The magnet frame 214 includes a main body extending between an L-shaped side 236 and an L-shaped right side 238. The L-shaped left and right sides 236, 238 extend the vertical length of the magnet frame 214. The magnet frame 214 an opening within a middle configured to receive the magnet array 212. Each magnet of the magnet array 212 may be attached to the magnet frame 214 by an epoxy around the edges of the magnet array 212 and around the edges of each individual magnet in order to secure the magnets to each other. The epoxy may be a temperature resistant epoxy which does not degrade at the elevated temperatures that the magnets may be raised to during operation. In other embodiments, the magnets may be attached to the magnet frame 214 through a mechanical means such as through a slot within the tiles integrating with a protrusion or slot of the magnet frame 214. Another alternative or additional approach may include utilizing set screws to tighten, compress or otherwise clamp down on the magnets by the magnet frame 214 along the edges of the magnets.

The array of magnets 380*a* attached to one of the side frames 310, 312 is also shown in this Figure, with the side frame removed, so that the close dimensional relationship between the array of magnets 380*a* and the magnet frame 214 can be seen. The gap between the array magnets 380*a* and the magnet frame 214 may be optimized to provide for the desired damping force when the system is shut down. For example, gaps of 0.3 mm, 0.25 mm, 0.2 mm, 0.15 mm are contemplated. Any gap that achieves the desired amount of damping through interaction with eddy currents is contemplated.

Figure 11:
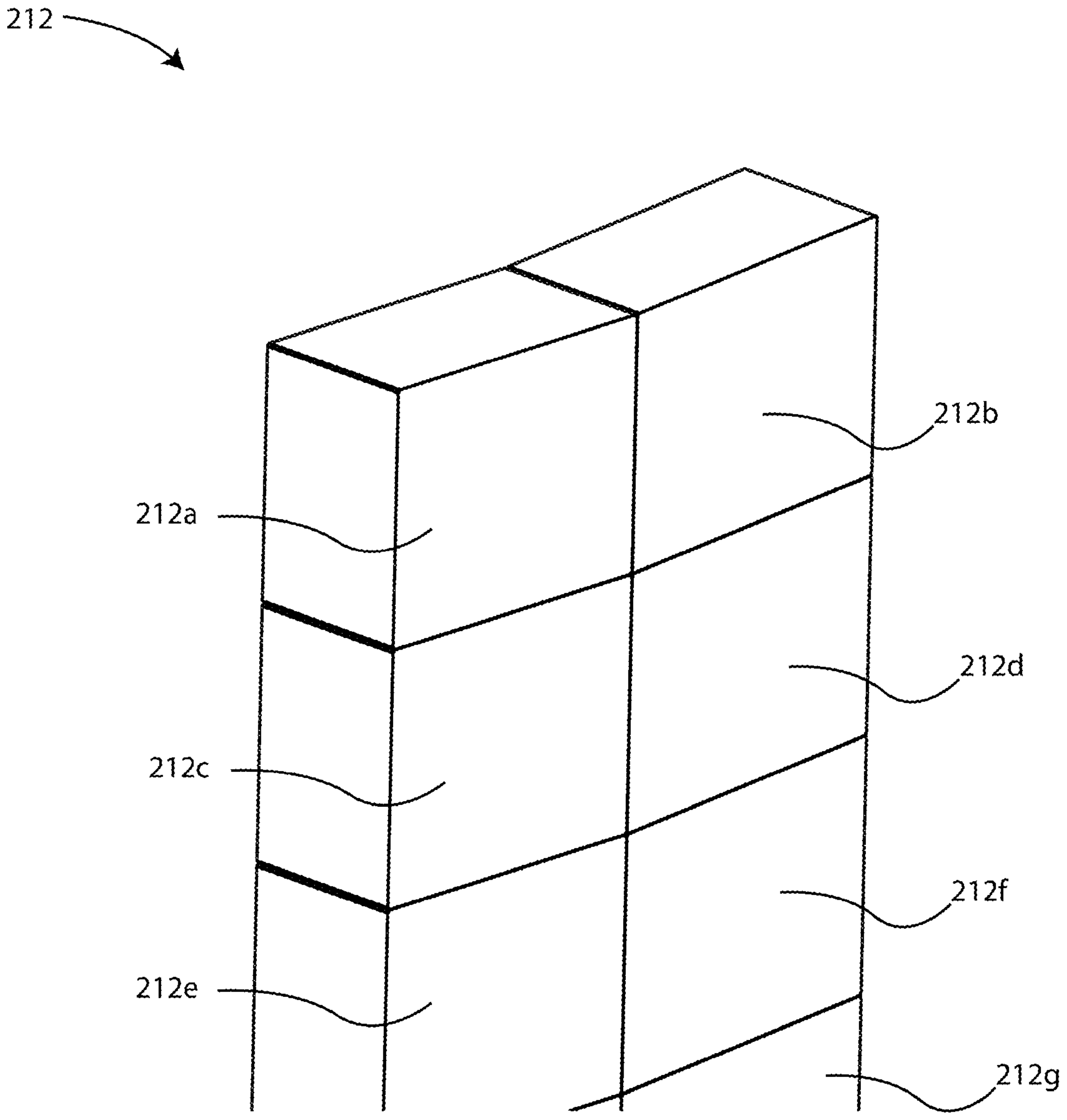
FIG. 11 depicts an enlarged perspective view of a portion of a magnet array of the magnet frame of FIG. 10, in accordance with one embodiment.

FIG. 11 depicts a portion of the magnet array 212 of the magnet frame of FIG. 10, in accordance with one embodiment. Shown is a view of several individual magnets 212*a*, 212*b*, 212*c*, 212*d*, 212*e*, 212*f*, 212*g* that has been enlarged to show the skew and dimensions of each of the magnets in the magnet array 212. Each of the magnets 212*a*, 212*b*, 212*c*, 212*d*, 212*e*, 212*f*, 212*g* in the magnet array 212 (both those shown in FIG. 11, and those extending below the view shown) may be permanent neo magnets, such as NdFeB magnets. The magnets 212*a*, 212*b*, 212*c*, 212*d*, 212*e*, 212*f*, 212*g* of the magnet array 212 are each shown skewed by a slight angle, such as a single degree. Thus, the magnets 212*a*, 212*b*, 212*c*, 212*d*, 212*e*, 212*f*, 212*g* may include a parallelogram shape such that a bottom and top edge of each of the flat tile magnets is not orthogonal to side edges of the flat tile magnets. As shown, the top-left edge of each of the magnets 212*a*, 212*c*, 212*e* is at a higher location than the top-right edge. Similarly, the top-right edge of each of the magnets 212*b*, 212*d*, 212*f*, 212*g* is higher than the top-left edge. In other words, the magnet dimensions are lower as the magnets approach the middle of the magnet array 212 than at the edges of the magnet array 212. This skew could also be flipped so that the magnet dimensions are higher as the magnets approach the middle of the magnet array 212 than at the edges of the magnet array 212. The skew may be a single degree, 2 degrees, 3 degrees any appropriate amount, and may be optimized to reduce cogging forces during interaction with the magnetic field created by the stator assembly 400.

In an exemplary embodiment, the width of each magnet may be between 50 and 100 mm, while the height may be between 10 and 50 mm. The thickness of each magnet may be between 10 and 22 mm. In one exemplary embodiment, the magnets may include a width of 70 mm, a height of 28 mm, and a thickness of 18 mm. These dimensions may be altered depending on the force output required by the magnet array 212.

Figure 12:
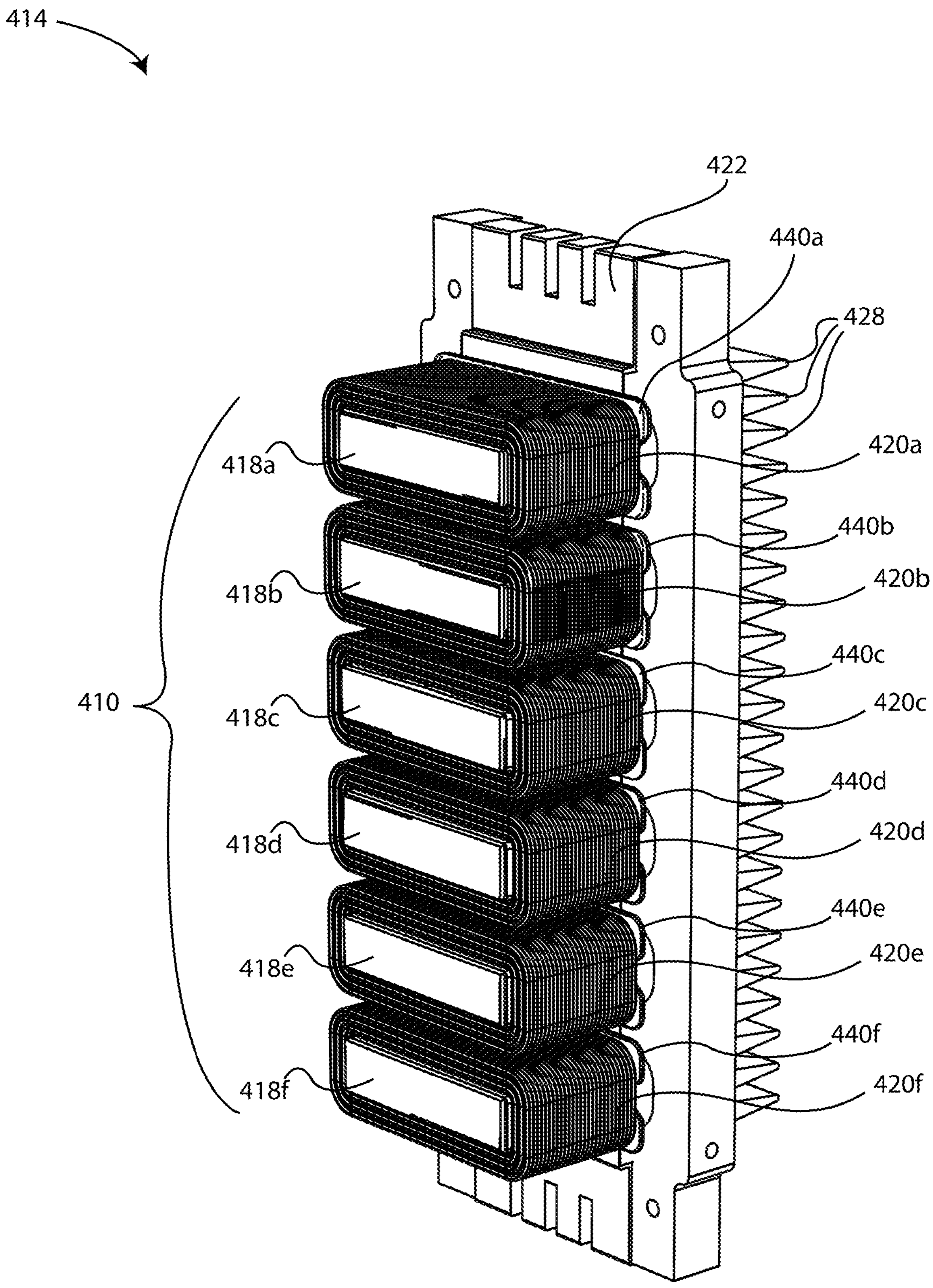
FIG. 12 depicts a perspective view of a coil sub-assembly of the linear motor of FIGS. 1 and 3, in accordance with one embodiment.

FIG. 12 depicts a perspective view of the first coil sub-assembly 414 of the linear motor 100 of FIGS. 1 and 3, in accordance with one embodiment. While not shown, the second coil sub-assembly 418 may share the same features and dimensions as the first coil sub-assembly 414. The coil sub-assembly 414 is shown including the first laminated magnetic core 422 having the six separate poles 418*a*, 418*b*, 418*c*, 418*d*, 418*e*, 418*f* (generally 418) upon which the six separate windings 420*a*, 420*b*, 420*c*, 420*d*, 420*e*, 420*f* (generally 420) are wrapped, respectively, creating the first coil stack 410. The laminated magnetic core 422 may include many laminations held together by stack pressing bars on each side. The laminated magnet core 422 may include 200 laminations (metal sheets) made of M19 electrical steel, for example. The laminations may include fins 428 which may increase surface area of the laminated magnet core 422 to facilitate cooling. In exemplary embodiments, the pole spacings between the six separate poles 418*a*, 418*b*, 418*c*, 418*d*, 418*e*, 418*f* may be between 20 and 60 mm. In one embodiment, the pole spacing may be 38 mm. In some embodiments, the pole spacing may be equal between each of the poles 418*a*, 418*b*, 418*c*, 418*d*, 418*e*, 418*f*. In other embodiments, different pole spacing may be advantageous to optimize heat distribution, magnetic field output, and the like. In exemplary embodiments, the thickness of the poles 418*a*, 418*b*, 418*c*, 418*d*, 418*e*, 418*f* may be between 10 and 20 mm. In on embodiment, the pole thickness may be 15.8 mm. The six separate windings 420*a*, 420*b*, 420*c*, 420*d*, 420*e*, 420*f* may be made of 16 AWG round wire, for example, and may include 168 turns. The windings 420*a*, 420*b*, 420*c*, 420*d*, 420*e*, 420*f* may each include six layers with 28 turns per layer. Coil bobbins 440*a*, 440*b*, 440*c*, 440*d*, 440*e*, 440*f* (generally, coil bobbins 440) may further be included on each of the poles 418*a*, 418*b*, 418*c*, 418*d*, 418*e*, 418*f*. The coil bobbins 440*a*, 440*b*, 440*c*, 440*d*, 440*e*, 440*f* are described hereinbelow and shown in FIG. 14.

Figure 13:
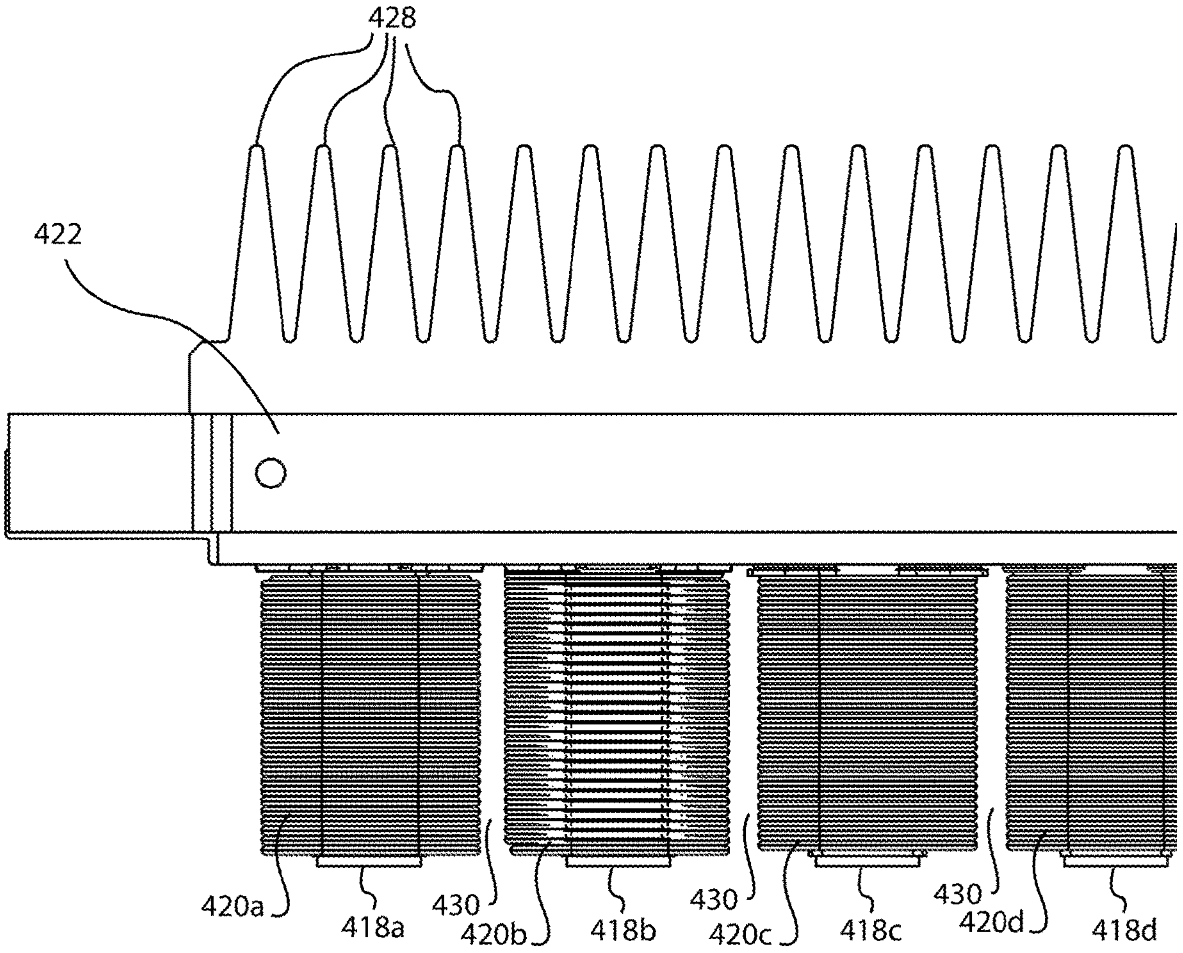
FIG. 13 depicts a side view of a portion of the coil sub-assembly of FIG. 12, in accordance with one embodiment.

FIG. 13 depicts a side view of a portion of the coil sub-assembly 414 of FIG. 12, in accordance with one embodiment. After being wound on the poles 418*a*, 418*b*, 418*c*, 418*d*, 418*e*, 418*f*, gaps 430 may exist between the windings 420*a*, 420*b*, 420*c*, 420*d*, 420*e*, 420*f*. The gaps 430 may allow for cooling airflow to be moved therethrough. The gaps 430 may each be several mm in thickness. For example, a gap thickness of 4.5 between each of the windings 420*a*, 420*b*, 420*c*, 420*d*, 420*e*, 420*f* is contemplated. The gap thickness may be, for example, between 3 and 10 mm. In other embodiments, the gap thickness may be filled by a potting material, as described hereinbelow and shown in FIG. 15.

Figure 14:
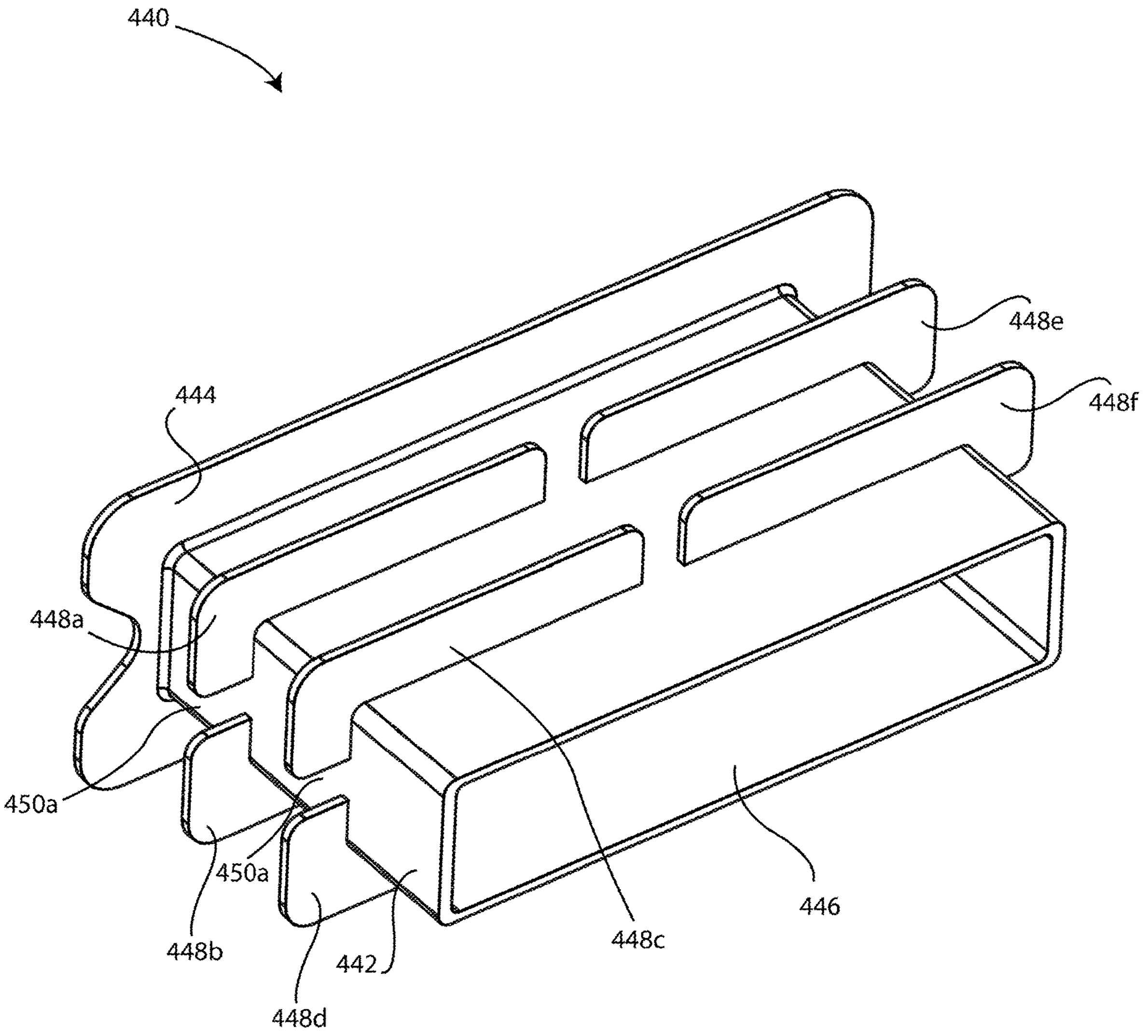
FIG. 14 depicts a perspective view of a coil bobbin with integrated cooling fins of the coil assembly of FIG. 12, in accordance with one embodiment.

FIG. 14 depicts a perspective view of one of the coil bobbins 440 with integrated cooling fins 448*a*, 448*b*, 448*c*, 448*d*, 448*e*, 448*f*, in accordance with one embodiment. The coil bobbin 440 includes a main body 442 that extends from a base 444. The main body 442 includes a generally rectangular cross section that surrounds and creates an opening 446 dimensioned for surrounding and receiving one of the poles 418. The coil bobbin 440 further includes the plurality of fins 448*a*, 448*b*, 448*c*, 448*d*, 448*e*, 448*f* extending from the main body 442. Winding gaps 450*a*, 450*b* may be located between the plurality of fins 448*a*, 448*b*, 448*c*, 448*d*, 448*e*, 448*f*. The winding gaps may allow for the wire of the windings 420 to be wound between each of the sections of the coil bobbin 440. The fins 448*a*, 448*b*, 448*c*, 448*d*, 448*e*, 448*f* of the coil bobbin 440 may be tall enough to extend through the windings 420, out into the force convection zone between the coils. The coil bobbins 440 may thereby help to increase conduction of heat away from the windings 420. The fins 448*a*, 448*b*, 448*c*, 448*d*, 448*e*, 448*f* may further increase the available surface area for forced convection.

Figure 15:
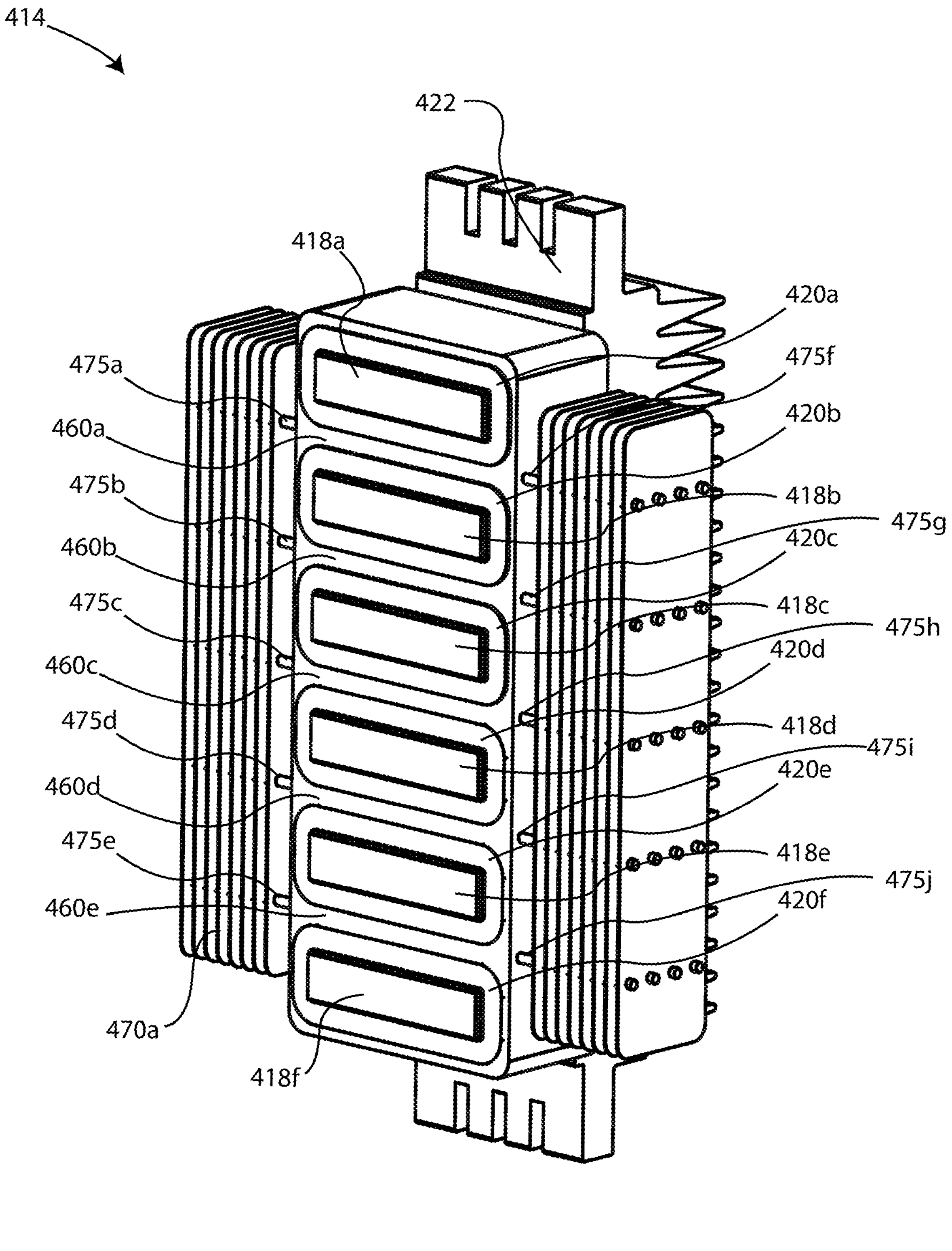
FIG. 15 depicts a perspective view of the coil sub-assembly of FIG. 12 with heat pipes and additional cooling fins, in accordance with one embodiment.

FIG. 15 depicts a perspective view of the coil sub-assembly 414 of FIG. 12 with heat pipes 475 and additional cooling fins 470 attached thereto, in accordance with one embodiment. This embodiment may be applied in addition to the coil bobbins 440 or as an alternative. In this embodiment, potting material 460*a*, 460*b*, 460*c*, 460*d*, 460*e* may be included within each of the gaps between the windings 420*a*, 420*b*, 420*c*, 420*d*, 420*e*, 420*f*. Extending from the potting material within each of the gaps is shown to be four heat pipes 475. For example, four heat pipes 475*a* extend from the left side between the top gap in the windings, four heat pipes 475*b* extend from the left side between the second gap, four heat pipes 475*c* extend from the left side between the third gap, four heat pipes 475*d* extend from the left side between the fourth gap, and four heat pipes 475*e* extend from the left side between the fifth gap. Similarly, four heat pipes 475*f* extend from the right side between the top gap in the windings, four heat pipes 475*g* extend from the right side between the second gap, four heat pipes 475*h* extend from the right side between the third gap, four heat pipes 475*i* extend from the right side between the fourth gap, and four heat pipes 475*j* extend from the right side between the fifth gap. In some embodiments, the heat pipes 475*a* and 475*f* extending from the left and right sides, respectively, may be the same component (i.e. a single heat pipe that extends in both directions). The heat pipes may be configured to transfer heat from the windings 420 to a plurality of cooling fins 470*a*, 470*b* located on each side. As shown, each of the left and right side includes eight cooling fins 470. The cooling fins 470 may provide for increased surface area for cooling. In this embodiment, alternative or in addition to forcing air through the gaps between the windings 420, cooling air is configured to be blown across the cooling fins 470 and the fins 428 of the laminated magnet core 422.

Figure 16:
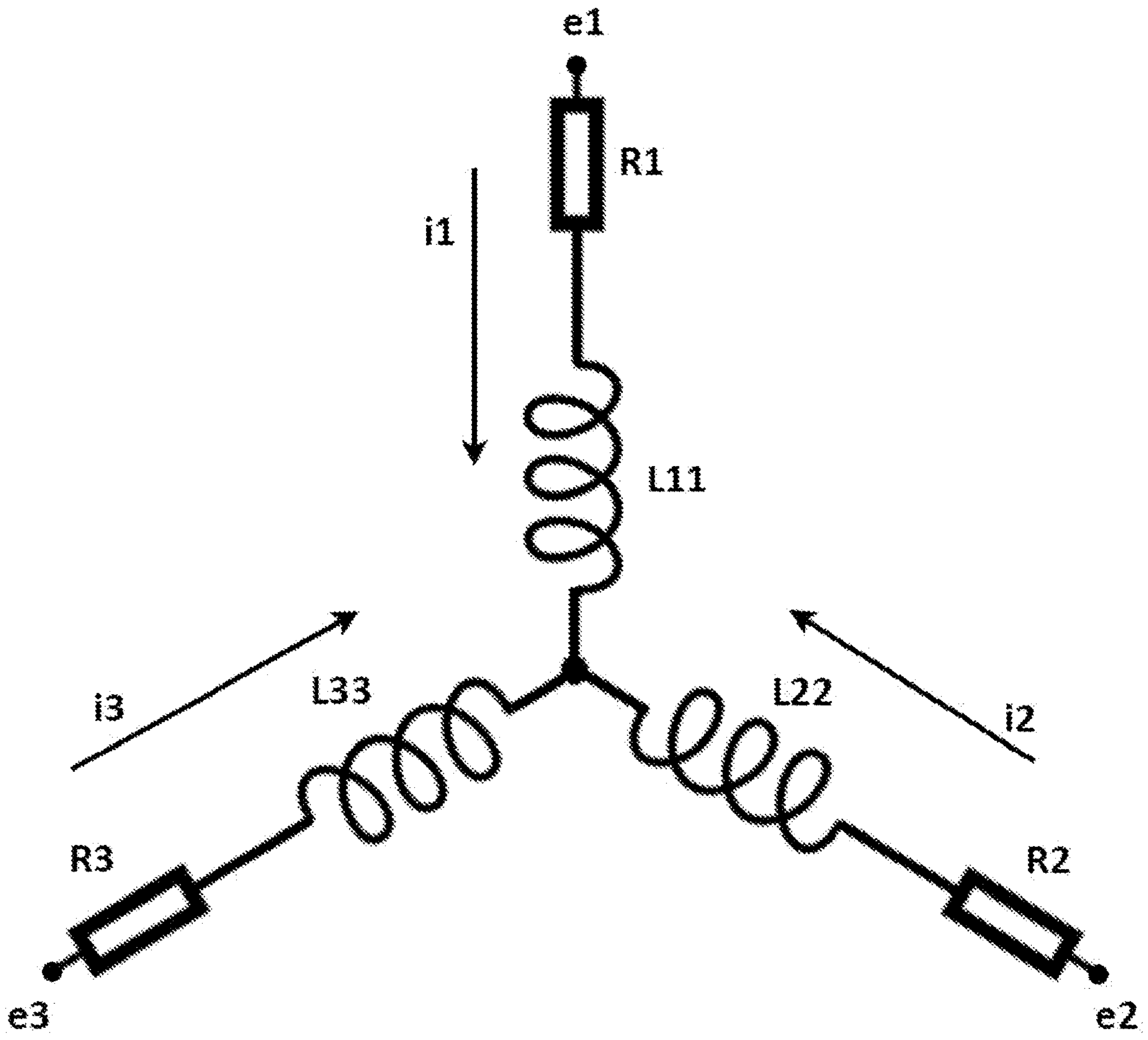
FIG. 16 depicts an electrical schematic of a three-phase motor of the linear motor of FIGS. 1 and 3, in accordance with one embodiment.

FIG. 16 depicts an electrical schematic of a three-phase motor of the linear motor 100 of FIGS. 1 and 3, in accordance with one embodiment, where $e_1$, $e_2$, $e_3$ are voltages driven by an amplifier to control three respective currents $i_1$, $i_2$, $i_3$, and therefore the force output of the motor. Inductors $L_{11}$, $L_{22}$, $L_{33}$ exist in series to resistances R for each phase.

Using the three-phase motor of the linear motor 100, the acceleration of the armature can be defined as:

$$mx''(t)=-kx(t)-bx'(t)+NBL_1i_1(t)+NBL_2i_2(t)+NBL_3i_3(t)-mg$$

where m is the mass of the armature, x"(t) is the acceleration of the armature, k is the spring constant of the system (which will be related to the spring constant of the test material the armature is connected to, or zero if the armature is not connected to a test material), b is the damping constant, x(t) is the position of the armature, x'(t) is the velocity of the armature, is an array of motor force/back EMF constants, each phased 120° apart for each phase, i is the current for each of phases a, b and c.

The voltage in the first leg can be defined as:

$$e_1(t)=L_{11}i'_1(t)+L_{12}i'_2(t)+L_{13}i'_3(t)+R_1i_1(t)+x'(t)NBL_1$$

where $e_1[t]$ is the voltage of the first phase, $L_{11}$ is inductance in the first phase induced by the inductor of the first phase, $L_{12}$ is inductance in the first phase induced by the inductor of the second phase, $L_{13}$ is inductance in the first phase induced by the inductor of the third phase, $i_1'(t)$, $i_2(t)$, and $i_3(t)$ are the changes of current in phases a, b, c, and R is the resistance of each individual phase. Similarly, the voltages of the second and third legs can be defined as:

$$e_2(t)=L_{21}i'_1(t)+L_{22}i'_2(t)+L_{23}i'_3(t)+R_2i_2(t)+x'(t)NBL_2$$

$$e_3(t)=L_{31}i'_1(t)+L_{32}i'_2(t)+L_{33}i'_3(t)+R_3i_3(t)+x'(t)NBL_3$$

As long as movement exists in the armature, even when the voltages in the three legs ($e_1(t)$, $e_2(t)$, $e_3(t)$) are cut to zero, the x'(t) NBL terms in each of the voltage equations will not be zero because the armature is moving. This shows that EMF is created by these x'(t) NBL terms, which produces a current change, and therefore a force, which will resist that motion in accordance to the acceleration formula. Thus, the three phase motor, and the movement of the armature is configured to create a damping force, when the current in each phase is cut or shorted, that further slows movement of the armature in addition to the eddy current magnet system described herein above.

Embodiments of the present invention may therefore include a suspension system which supports a range of motion of an armature without physically touching the armature, and without sliding and/or without rolling friction there between. For example, the suspension system may be configured to facilitate movement of the armature in one dimension relative to the stator assembly without physically touching the armature. In one embodiment or implementation, air bushings may provide, support, or otherwise facilitate a range of motion for the armature (stroke length) in one dimension (e.g. back and forth along a single axis of movement) without the suspension system being mechanically or structurally connected, attached, or touching the armature during operation. The suspension system may be configured to limit movement, or at least substantially limit movement (in the case that the air bushings are compliant and allow for a very small degree of compliance in another dimension), of the armature in this one dimension, or along this one axis of movement.

In exemplary embodiments, the absence of a mechanical or structural connection prevents contact friction between the suspension system and the armature during operation or movement, and may be provided by the air gap located between the air bushings of the suspension system and air bushing shafts of the armature. Suspension systems contemplated herein thereby create a support system for maintaining refined motion of the armature without structural contact or connection in a single dimension or along a single axis of movement. Suspension systems contemplated herein may thereby be considered to be in indirect mechanical communication (e.g. via the air gaps) with the armature during operation and movement thereof.

Methods of operating a linear motor and/or a material testing device or system are also contemplated. For example, a contemplated method includes providing a linear motor having a multi-phase stator assembly, an armature proximate the multi-phase stator assembly, and a suspension system. The method includes receiving power by the multi-phase stator assembly, moving the armature back and forth along an axis of movement after the receiving power by the multi-phase stator assembly, and supporting the armature with the suspension system by controlling movement of the armature relative to the multi-phase stator assembly such that no sliding or rolling contact is made between the armature and the suspension system. The method includes utilizing a three-phase linear motor and stator assembly to create a magnetic field that moves a magnetic armature. Methods may include moving the armature back and forth along an axis of movement with a stroke length greater than 70 mm, 80 mm, 90 mm, or 100 mm Methods contemplated include disposing poles in a stator such that the phases alternate in an A-B-C-A-B-C relationship.

Further contemplated methods include providing a stator assembly, an armature proximate the stator assembly having an array of flat magnets disposed thereon, and a suspension system. Contemplated methods include receiving power by the stator assembly, exposing the array of flat magnets to a magnetic field generated by the stator assembly, creating back and forth movement in the armature, by the array of flat magnets, and supporting the armature with the suspension system by controlling movement of the armature relative to the multi-phase stator assembly such that no sliding or rolling contact is made between the armature and the suspension system. Methods may further include skewing the flat magnets within the array of flat magnets with a skew angle between 0.5 and 5 degrees.

Still further, methods contemplated include providing a stator assembly, an armature proximate the stator assembly, and a suspension system. Methods include receiving power by the stator assembly, moving the armature back and forth along an axis of movement after the receiving power by the stator assembly, supporting the armature with the suspension system without physically touching the armature by the suspension system during movement. Methods include, allowing, by the suspension system, movement of the armature with respect to the suspension system without sliding or rolling contact between the armature and the suspension system and without a structural connection between the armature and the stator assembly. Methods may further include providing at least one air bushing in the suspension system. Methods may include allowing, by the air bushing, movement of the armature with respect to the suspension system without sliding or rolling contact between the armature and the suspension system. Methods employing air bushings may include using recycled air from the air bushing to cool components of the linear motor, such as a stator assembly, or magnets thereof.

Methods contemplated further include providing a stator assembly, an armature proximate the stator assembly, a suspension system, and a magnetic damping system. Methods include receiving power by the stator assembly, moving the armature back and forth along an axis of movement after the receiving power by the stator assembly, supporting the armature with the suspension system by controlling movement of the armature relative to the stator assembly such that no sliding contact or rolling is made between the armature and the suspension system, cutting power to the stator assembly, and absorbing kinetic energy of the armature movement, by the magnetic damping system, when power is cut to the linear motor. In cases where the damping method employs a multi-phase linear motor such as a three-phase linear motor, the method may include cutting power to each of the phases simultaneously and using eddy currents generated to damp movement of the armature. Methods further include using the movement of the armature between the coils of the system to produce current, and therefore force, that resists motion of the armature.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. For example, while the lack of any mechanical connection, attachment between the suspension system 300 and the armature 200 in embodiments described herein is a key inventive concept to some embodiments of the invention described herein, other inventive embodiments, it may be possible to incorporate other aspects of the inventive concepts described herein into a connected or attached suspension system as taught in U.S. Pat. No. 6,405,599. For example, embodiments of the invention may utilize a multi or three-phase linear motor, a flat magnet array armature and/or a damping system as described herein with the attached flexure component suspension system described within U.S. Pat. No. 6,405,599. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A testing device comprising:

a linear motor including a stator assembly, wherein the stator assembly includes a first coil sub-assembly and a second coil sub-assembly;

an armature mechanically coupleable to a test specimen configured to be moved relative to the stator assembly by operation of the linear motor, wherein the armature is located and extends between the first coil sub-assembly and the second coil sub-assembly; and a suspension system configured to facilitate movement of the armature relative to the stator assembly along an axis of movement without physically touching the armature during movement and without sliding or rolling contact between the armature and the suspension system, wherein the linear motor and the suspension system are configured to provide frictionless suspension of the armature and movement of the armature.

2. The testing device of claim 1, wherein the suspension system includes at least one air bushing that is configured to allow movement of the armature with respect to the suspension system without sliding or rolling contact between the armature and the suspension system.

3. The testing device of claim 1, wherein the axis of movement is a vertical axis of movement.

4. The testing device of claim 1, wherein each of the first coil sub-assembly and the second coil sub-assembly include a magnetic core, the magnetic core each having a plurality of poles upon which windings are wrapped.

5. The testing device of claim 4, wherein the magnetic core is made of electrical steel.

6. The testing device of claim 1, wherein the suspension system includes a frame body having a first opening extending along a first axis that is parallel to the axis of movement, wherein the at least one air bushing is located within the first opening, and wherein the armature includes a first air bushing shaft extending within the first opening.

7. The testing device of claim 6, wherein the at least one air bushing includes a first air bushing located proximate a first end of the first opening and a second air bushing located proximate a second end of the first opening.

8. The testing device of claim 7, wherein the frame body includes a second opening extending along a second axis that is parallel to the axis of movement, and wherein the armature includes a second air bushing shaft extending within the second opening, wherein the second opening includes a third air bushing located proximate a first end of the second opening and a fourth air bushing located proximate a second end of the second opening.

9. The testing device of claim 6, wherein the at least one air bushing is installed within the first opening of the frame body in a compliant manner such that some movement between the air bushing and the frame body is permitted.

10. The testing device of claim 6, wherein the at least one air bushing is removably attached within the first opening of the frame body with an interference fit.

11. A linear motor comprising:

a stator assembly configured to receive power, wherein the stator assembly includes a first coil sub-assembly and a second coil sub-assembly;

an armature proximate the stator assembly and configured to be moved relative to the stator assembly when the stator assembly receives power, wherein the armature is located and extends between the first coil sub-assembly and the second coil sub-assembly; and a suspension system configured to facilitate movement of the armature relative to the stator assembly along an axis of movement without physically touching the armature during movement and without sliding or rolling contact between the armature and the suspension system, wherein the linear motor and the suspension system are configured to provide frictionless suspension of the armature and vertical movement of the armature.

12. The linear motor of claim 11, wherein the suspension system includes at least one air bushing that is configured to allow movement of the armature with respect to the suspension system without sliding or rolling contact between the armature and the suspension system.

13. The linear motor of claim 11, wherein the axis of movement is a vertical axis of movement.

14. The linear motor of claim 11, wherein each of the first coil sub-assembly and the second coil sub-assembly include a magnetic core, the magnetic core each having a plurality of poles upon which windings are wrapped.

15. The linear motor of claim 14, wherein the magnetic core is made of electrical steel.

16. The linear motor of claim 11, wherein the suspension system includes a frame body having a first opening extending along a first axis that is parallel to the axis of movement, wherein the at least one air bushing is located within the first opening, and wherein the armature includes a first air bushing shaft extending within the first opening.

17. The linear motor of claim 16, wherein the at least one air bushing includes a first air bushing located proximate a first end of the first opening and a second air bushing located proximate a second end of the first opening.

18. The linear motor of claim 17, wherein the frame body includes a second opening extending along a second axis that is parallel to the axis of movement, and wherein the armature includes a second air bushing shaft extending within the second opening, wherein the second opening includes a third air bushing located proximate a first end of the second opening and a fourth air bushing located proximate a second end of the second opening.

19. The linear motor of claim 16, wherein the at least one air bushing is installed within the first opening of the frame body in a compliant manner such that some movement between the air bushing and the frame body is permitted.

20. A method comprising:

providing the testing device of claim 1;

receiving power by the stator assembly;

moving the armature relative to the stator assembly back and forth along a vertical axis of movement after the receiving power by the stator assembly;

suspending the armature with the linear motor and suspension in a frictionless manner; and supporting the armature with the suspension system without physically touching the armature during the moving and without sliding or rolling contact between the armature and the suspension system.

21. The testing device of claim 1, wherein the armature includes a magnet frame having a plurality of permanent magnets disposed thereon, wherein the plurality of permanent magnets are exposed from a first side of the armature proximate the first coil sub-assembly and from a second side of the armature proximate the second coil sub-assembly.

22. The linear motor of claim 11, wherein the armature includes a magnet frame having a plurality of permanent magnets disposed thereon, wherein the plurality of permanent magnets are exposed from a first side of the armature proximate the first coil sub-assembly and from a second side of the armature proximate the second coil sub-assembly.

* * * * *